US012409773B1

(12) United States Patent
Zhu

(10) Patent No.: US 12,409,773 B1
(45) Date of Patent: Sep. 9, 2025

(54) ADAPTIVE HEADLIGHTS FOR AUTONOMOUS VEHICLES

(71) Applicant: Zoox, Inc., Foster City, CA (US)

(72) Inventor: Lingxuan Zhu, Fremont, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 18/812,831

(22) Filed: Aug. 22, 2024

Related U.S. Application Data

(60) Provisional application No. 63/534,236, filed on Aug. 23, 2023.

(51) Int. Cl.
*B60Q 1/08* (2006.01)
*B60Q 1/00* (2006.01)
*F21S 41/153* (2018.01)

(52) U.S. Cl.
CPC .......... *B60Q 1/085* (2013.01); *B60Q 1/0023* (2013.01); *F21S 41/153* (2018.01); *B60Q 2300/45* (2013.01); *B60Q 2800/10* (2022.05)

(58) Field of Classification Search
CPC .. B60Q 1/085; B60Q 1/0023; B60Q 2300/45; F21S 41/153
See application file for complete search history.

(56) References Cited

U.S. PATENT DOCUMENTS

| | | | |
|---|---|---|---|
| 9,630,619 B1 * | 4/2017 | Kentley | G01C 21/3446 |
| 11,988,775 B1 | 5/2024 | Waschura et al. | |
| 2020/0398738 A1 * | 12/2020 | Lee | B60Q 1/0041 |
| 2024/0264280 A1 * | 8/2024 | Li | B60Q 1/0023 |

OTHER PUBLICATIONS

Dohnal, Sinisa, "New projected lighting effects build bond between car and driver", retrieved on Aug. 21, 2023, at <<https://ams-osram.com/news/blog/projected-lighting-advanced-led-and-micro-lens-array-technology>>, 7 pages.

* cited by examiner

*Primary Examiner* — Robert J May
(74) *Attorney, Agent, or Firm* — Lee & Hayes, P.C.

(57) ABSTRACT

Techniques for selectively illuminating regions of an environment are disclosed herein. For example, an autonomous vehicle can include one or more emitter systems (e.g., a headlight(s)) comprising an array of light emitters configured to controllably emit light into an environment. In some examples, a machine learned model(s) may generate configuration signals to control the individual light emitters of an emitter system based at least in part on one or more of sensor data (e.g., lidar data, image data, etc.). In some examples, the machine learned model may generate configuration signals based at least in part on map data. Additional sensor data may be captured after the emitter system is reconfigured and used to control the autonomous vehicle.

20 Claims, 8 Drawing Sheets

ADAPTIVE HEADLIGHTS FOR AUTONOMOUS VEHICLES

RELATED APPLICATIONS

This application claims the benefit of, and priority to, U.S. Provisional Application No. 63/534,236 filed on Aug. 23, 2023, which is incorporated herein by reference in its entirety.

BACKGROUND

Existing headlight technology for vehicles operated by human drivers is optimized for human perception. However, vehicles that operate autonomously depend on sensors to collect and process environmental data including data that may not be necessary or useful for a human driver. As such, traditional headlights may not be configured to optimally operate on autonomous vehicles.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DESCRIPTION

Figure 1:
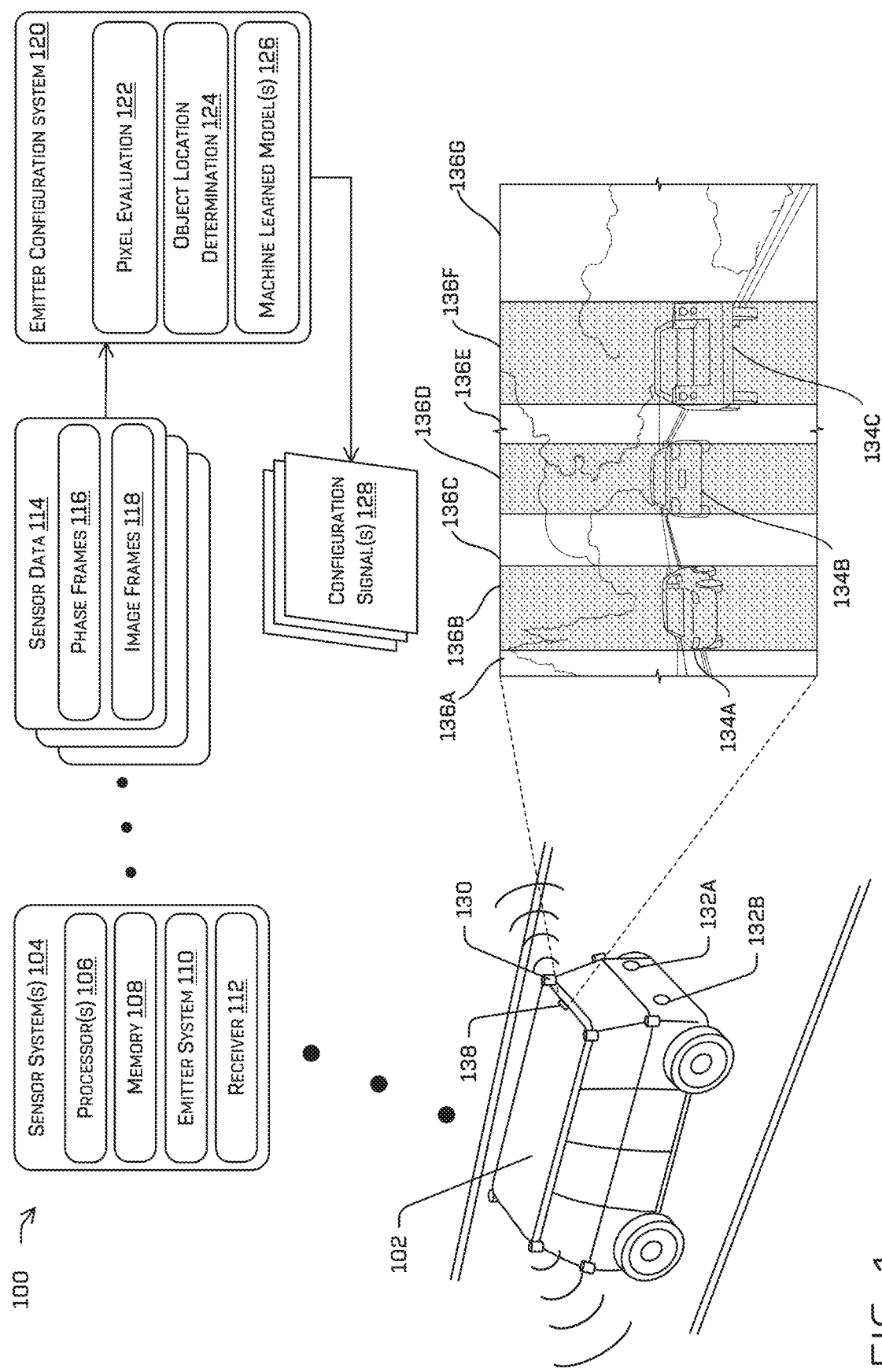
FIG. 1 is a schematic illustration showing an example vehicle, such as an autonomous vehicle, and example components and functionality of a sensor system associated with the vehicle, as described herein.

Autonomous vehicles collect and rely on environmental data through a growing array of sensors and cameras disposed about the vehicle. Techniques for adjusting light emitters on an autonomous vehicle are discussed herein. Adaptive lighting systems on an autonomous vehicle may be used to improve the accuracy of object detection, classification, and other perception tasks, particularly in bright or low-light environments, or during adverse weather conditions (e.g., when rain creates significant interference for lidar and radar sensors). As discussed herein, lighting systems can be described as adjustable (e.g., via mechanical manipulation, adjustment of light enclosure, etc.) and/or as adaptable/adaptive.

Techniques for selectively illuminating an object (e.g., a sign, traffic light, tree, vehicle, pedestrian, building, road surface, signage, barrier, road markings, etc.) in the environment are described herein. In some instances, selectively increasing and/or decreasing the illumination of a field of view of a sensor(s) can improve the detection of objects that would otherwise be unreliably detected or illegible (i.e., in the case of a street sign) due to bright backlighting. For example, when the sun or other bright light is positioned behind an object in the environment, this may impact detection of the object due to high contrast between the back light and the back-lit object and/or dynamic range compression. An emitter system (e.g., an adaptive driving beam (ADB) headlight, high-definition (HD) headlight, or other adaptive light source) on the autonomous vehicle may be used to project a beam of light (e.g., comprising a portion of light emitters of an emitter system) toward a particular region or location of an environment associated with the back-lit object in order to compensate for the bright background, which reduces the contrast and makes images of the object more perceptible to the vehicle. In examples, an adaptive light component associated with the light emitter may generate one or more configuration signals. Dynamically changing the illumination of one or more regions of a field of view of a sensor can improve the quality and reliability of sensor data and/or image data received from sensors disposed about the vehicle. An adaptive light source may be used to compensate for high contrast/saturated pixels, such as those caused by bright sunlight behind an object in the environment.

In implementations described herein, a system (e.g., an autonomous vehicle) can include a light source comprising an array of light emitters configured to controllably emit light into an environment. The light source (or light emitter) can include multiple independently controllable light emitting elements used to direct light to certain portions of an environment (e.g., to spotlight an object) as well as refrain from emitting light toward other portions of an environment (e.g., a retroreflective surface, an oncoming vehicle, etc.). By way of example and not limitation, adaptive light sources may include adaptive driving beam (ADB) headlights and/or a high-definition (HD) headlights. For instance, an adaptive HD headlight may comprise of an array of light emitting diodes (LEDs) or other light emitters arranged in a grid or other pattern and that can be granularly controlled by a central processor. Individual control of LEDs or groups of LEDs enables the autonomous vehicle to dynamically adjust the headlights based on the driving situation and environment, which can improve vehicle safety as well as pedestrians, other drivers, etc. Other technologies are contemplated, such as use of a polarizing filter (e.g., with multiple controllable zones), a digital micromirror device (DMD), Microelectromechanical systems (MEMS), a laser light source, micro-LED comprising a compact LED array, liquid crystal on silicon (LCoS), etc.

An ADB headlight may comprise multiple, independently controllable emitters that are configured to emit different light patterns according to various emitter configurations. The emitters may be controlled to vary a direction and/or focus of emitted light, and/or control the emitted light in multiple, separate beams or columns of light (e.g., by segmenting light into vertical and/or horizontal zones). In some examples, the emitter system may control the size, shape, focus, and/or position of the emitted light by moving or orienting the light emitters themselves. Additionally, or alternatively, in some examples the emitter system may use movable mirrors or other optics to steer the light emitted by the emitters to achieve the desired size, shape, focus, and/or position of the emitted light. These technologies can enable a headlight to emit light into one or more zones from the headlight and preclude emittance of light from one or more other zones.

In some examples, an emitter system may be a headlight, a light bar, light source disposed on a sensor housing or other location of a vehicle. The emitter system may comprise any number of light emitters that operate concurrently or independently of each other. In some examples, the adaptive light source may comprise an array of independently controllable emitters and/or filters that are positioned in any number of rows and/or columns. In examples, the independently controllable emitters and/or filters may be associated with individual drivers that enable individual light emitters to be controlled independently or in groups. In some examples, individual rows and/or columns of light emitters may be controlled by individual microcontrollers. In some examples, the microcontrollers can dynamically increase/decrease the amount (e.g., intensity) of light emitted by the light emitters within a range (e.g., by changing a frequency of the electrical signal driving individual light emitters), cause the light emitters to emit light at different angles, emit light in a different shape, color, or light pattern, etc. The independently controllable light emitters may be reconfigured in any number of light pattern configurations by controlling an illumination intensity of the emitted light, a direction of the emitted light, a focus of the emitted light, and/or control the emitted light such that one or more discrete beams of light are emitted.

In examples, the emitter system may include one or more visible light emitters and/or one or more infrared (IR) or near infrared (NIR) light emitter (and/or any other frequency or wavelength). In at least one example, the adaptive light source may comprise a combination of visible and non-visible (e.g., IR) light emitters.

In some examples, light from light emitters and/or filters may be redirected to avoid (or shine at a lower intensity) on highly reflective surfaces or objects (e.g., retroreflectors, license plate, street sign, chrome parts of cars, decorative trim, etc.). Additionally or alternatively, in some examples, an emitter system may direct light (or an increased intensity of light) toward regions or objects in an environment that are less reflective, are associated with less reliable sensor data (e.g., due to low light conditions, or a high contrast), for redundancy, and/or other reasons.

In some examples, sensor data can be captured by one or more sensors, which can include lidar sensors, image sensors, SONAR sensors, time-of-flight sensors, RADAR sensors, microphones, or any combination thereof. A sensor can include an emitter to emit a signal and a sensor to sense a return signal from the environment. In some examples, captured sensor data can be represented, in quadrant format, a point cloud, as an image, etc. In some instances, the sensor data in the quadrature format can include one or more pixels where each pixel can be represented as a numerical value (e.g., 12 bits with a value range of 2-11 to (211-1)). After determining the sensor data in the quadrature format, a sensor computing device (e.g., an FPGA, SoC, ASIC, CPU, etc.) can determine the sensor data in an intensity and depth format. In some instances, the intensity and depth format can include an intensity image and a depth image having, respectively, per-pixel intensity and depth values. In some examples, the sensor computing device can also, using the sensor data in the intensity and depth format, perform an operation (mapping 2D data to 3D data) to determine the sensor data in an unprojected format to project each pixel in the sensor data into a multi-dimensional space (e.g., 3D-space using an x-position, a y-position, and a z-position).

In some examples, techniques described herein can include receiving first sensor data from the one or more sensors. First sensor data may include, for example, lidar data, camera image data, sonar sensor data, time-of-flight sensor data, RADAR data, audio data from a microphone, or any combination thereof. In some examples, a region of interest may be determined based at least in part on the sensor data.

In some examples, a region of interest and/or illumination pattern of an emitter system may be based on map data (e.g., generated map data and/or historical map data) in the absence of image or lidar data or when the sensor data is not reliable (e.g., does not meet or exceed a threshold due to rainy, foggy, or other poor weather or environmental condition and/or malfunction).

A sensor may be used to generate sensor data as the vehicle traverses the environment. In some examples, the vehicle may use SLAM (simultaneous localization and mapping) or CLAMS (calibration, localization and mapping, simultaneously) to receive image data, and/or a time-of-flight sensor, lidar data, radar data, SONAR data, IMU data, GPS data, wheel encoder data, or any combination thereof, and the like to determine a location of the autonomous vehicle and/or location of objects in the environment. A sensor may be configured to image a field of view corresponding to a region of an environment surrounding the vehicle. The sensor data may include quadrature values, intensity and depth information, phase frames, and/or image frames. A sensor system may compute the intensity and/or depth values based at least in part on phase values of a plurality of phase frames. The intensity and depth values calculated using the phase frames can be embodied as image frames. The image frames can include a stream of serially-generated image frames where each of the image frames may include data related to the intensity and depth for each of a plurality of pixels associated with a receiver sensor. The image frames can include a depth image and an intensity image generated by the sensor system and representative of a portion of the environment.

Different attributes of the environment can result in degraded or unreliable sensor data quality. For example, ambient light (e.g., sunlight) may have the same or similar wavelength as illumination light emitted and thus, can be perceived at pixels of a receiver of a sensor (e.g., a time-of-flight sensor) as a return. High ambient light conditions, such as those caused by sunlight behind an object, can result in oversaturation of pixels. Stray light and/or glare can adversely impact pixel quality and other sensor data. Techniques described herein can use the phase frames and/or the image frames to determine an emitter configuration associated with an adaptive light source that ultimately reduces the impact of environmental factors on pixel quality. Controlling aspects of an emitter system can provide an improved dataset that may better represent the environment and/or may have a higher associated confidence associated with detect objects in the environment. In some examples, causing the adaptive light source to emit a directed beam of light toward a particular region in the environment is based on determining that a confidence of a classification of an object is below a threshold confidence.

An image sensor may be configured to receive image data comprising a plurality of pixels. By way of non-limiting example, one or more processor(s) may be configured to execute actions associated with a pixel evaluation component, an object location determination component, and/or the light emitter control component. The pixel evaluation component may be configured to determine reliability of data associated with individual pixels (e.g., to determine whether data associated with a pixel is "good" or "bad," reliable or unreliable, etc.). In at least one example, the pixel evaluation component can determine whether pixels are saturated (e.g., from intensity information in the image frames). For example, saturated pixels may have an intensity that corresponds to a predetermined (e.g., maximum) value of the sensor. The pixel evaluation component may also or alternatively use phase frames to determine the unreliable pixels. In some examples, the pixel evaluation component can identify a pixel as unreliable when a phase value for individual pixels does not conform to a predetermined property. The pixel evaluation component can also look to the image frames to determine whether pixels are reliable or not. In examples, the pixel evaluation component can determine whether data associated with a pixel is inaccurate (e.g., because of an abundance of light received at the pixel due to sunlight or other bright light source). In some examples, a pixel may be determined to be unreliable based on determining that a sensor of a first modality (e.g., image sensor, time-of-flight sensor, etc.) detects an object and a sensor of a second modality does not (e.g., the object is not detected in a radar or lidar data, etc.). In some examples, the pixel can be indicated as saturated (e.g., as having an intensity over a threshold value) or otherwise unreliable because a confidence associated with the pixel may be at or below a confidence value.

In some examples, a portion of the image data may be determined to include a threshold number of unreliable pixels (e.g., saturated pixels or underexposed pixels). In examples, the unreliable pixels may correspond to a location of the environment associated with bright sunlight or other bright source located behind an object. An object location determination component can determine a location of one or more objects in a field of view of the sensor associated with a portion of the unreliable pixels. An object location component can receive the sensor data and identify and/or classify one or more objects from the image frames. In examples, the presence and/or position of an object may be inferred from the presence of a group of unreliable pixels (e.g., a group or threshold number of pixels that are unreliable or saturated). In some examples, the object(s) may be identified from sensor data as groups of pixels having the same intensity or same depth. In at least some examples, the object location determination component can receive additional data and determine the presence and/or location of the objects from this additional information (e.g., from one or more additional sensors associated with the same or different sensor modalities, a perception system or other system associated with the vehicle). In examples, a perception system of the vehicle may be configured to generate a bounding box to indicate objects in the environment. In some examples, an object may be detected in the image data, where the object is located in an environment proximate the threshold number of unreliable pixels. In examples, the object location determination component may determine the position of the object in a frame of reference unique to the sensor data.

In some examples, sensor data may be used to determine whether to alter the illumination intensity of individual light emitting elements of an emitter system (e.g., an ADB headlight). One or more light emitters associated with an ADB headlight may be used to emit a beam of light having an increased illumination intensity toward the region in the environment associated with the object or proximate the object in order to illuminate the object and reduce a contrast between the saturated pixels and pixels representing the object. In examples, a light emitter may emit a beam of light toward the object when at least one pixel of all pixels proximate the object are saturated or unreliable, a ratio of saturated/unreliable pixels to unsaturated/reliable pixels or total pixels proximate the object meets or exceeds a threshold ratio, a number of saturated/unreliable pixels meets or exceeds a predetermined number of saturated/unreliable pixels, a confidence of the classification of the object is below a threshold confidence, or the like.

In examples, an occupancy state (e.g., whether an object is present) of a region of an environment may be determined based on sensor data. In at least one example, the occupancy state is represented in an occupancy grid which comprises a top-down representation of the environment. In examples, the occupancy state of a region may be associated with a confidence level. The confidence level may depend on external factors such as environmental conditions (e.g., weather conditions such as rain, snow, ice, and/or bright sunlight, low-light conditions, etc.) where a lower confidence level is assigned to sensor data based at least in part on the environmental condition. For example, low-light or adverse weather conditions can increase significant interference for lidar and radar and the precise resolution of an ADB/HD system can improve the accuracy and confidence of detecting and/or classifying objects. In some examples, the occupancy status of a region is based at least in part on image data from an image sensor and sensor data from at least one other type of sensor or modality of sensor, and the confidence level associated with the occupancy status is based at least in part on a degree of agreement or discrepancy between the image data and the sensor data from the other type of sensor or modality of sensor.

Further detail and additional aspects of determining states of an occupancy grid are described in U.S. Pat. No. 10,642,275, entitled "Occlusion Aware Planning and Control," filed Jun. 18, 2018. Patent '275 is hereby incorporated by reference in its entirety. Without limitation, occupancy states may be determined in accordance with techniques described in the '275 patent. For example, as described in patent '275, an autonomous vehicle may determine, based on available data, that a portion of an occlusion grid is unknown (i.e., whether the occlusion field is occupied or not). In some examples, an adaptive light source may be used to illuminate portions of the occlusion grid that are determined to be unknown or determined to be associated with a confidence level that does not meet or exceed a threshold. That is, an ADB headlight(s) and/or an HD headlight(s) may be used to selectively illuminate portions of the environment while avoiding illuminating other portions of the environment in order to avoid causing artifacts in sensors and/or flashing lights at pedestrians or drivers. In some instances, using multiple sensor modalities (e.g., lidar sensors, image sensors, radar sensors, etc.) can improve an overall confidence level associated with an occlusion state or occupancy state of an occlusion field.

The quality of sensor data from some sensor modalities may be affected by environmental conditions (e.g., image data from an image sensor may be less reliable in low light environments). Selectively emitting light from an ADB headlight(s) and/or an HD headlight(s) may improve a quality or confidence level associated with image data. In some examples, multiple light emitters associated with an HD headlight may be used to illuminate various zones in the environment independently. The zones in the environment may be a combination of unknown occupancy states, objects positioned in front of a backlit environment, etc. in any combination. That is, in at least one example, a first portion of the multiple light emitters of an adaptive light source may be adjusted (e.g., by increasing an illumination intensity and/or an angle of the first portion of the multiple light emitters, etc.) in order to emit light in a first zone in the environment and a second portion of the multiple light emitters may be adjusted differently (e.g., by decreasing an illumination intensity, and/or angle of the second portion of the light emitters, etc.) in order to emit light at a second zone in the environment.

In examples, pixel quality, object detection, object classification, object identification, or other data may be used to determine whether to adjust the settings or configuration of the adaptive light source (e.g., whether to alter the illumination intensity, angle, pattern, etc. of one or more light emitters associated with the adaptive or otherwise adjustable light source).

FIG. 1 illustrates an example environment 100 through which an example vehicle 102 is traveling. The example vehicle 102 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for an entire trip, with the driver (or occupant) not being expected to control the vehicle at any time. In such examples, because the vehicle 102 can be configured to control all functions from start to completion of the trip, including all parking functions, the vehicle may not include a driver and/or controls for manual driving, such as a steering wheel, an acceleration pedal, and/or a brake pedal. This is merely an example, and the systems and methods described herein may be incorporated into any groundborne, airborne, or waterborne vehicle, including those ranging from vehicles that need to be manually controlled by a driver at all times, to those that are partially or fully autonomously controlled.

The example vehicle 102 can be any configuration of vehicle, such as, for example, a van, a sport utility vehicle, a cross-over vehicle, a truck, a bus, an agricultural vehicle, and/or a construction vehicle. The example vehicle 102 can have four-wheel steering and can operate generally with equal performance characteristics in all directions. For instance, the vehicle 102 may be configured such that a first end of the vehicle 102 is the front end of the vehicle 102, and an opposite, second end of the vehicle 102 is the rear end when traveling in a first direction, and such that the first end becomes the rear end of the vehicle 102 and the second end of the vehicle 102 becomes the front end of the vehicle 102 when traveling in the opposite direction. Stated differently, the vehicle 102 may be a bi-directional vehicle capable of travelling forward in either of opposite directions. These example characteristics may facilitate greater maneuverability, for example, in small spaces or crowded environments, such as parking lots and/or urban areas.

In some examples, the vehicle 102 may be a bidirectional vehicle capable of changing a direction of travel. A change in a direction of travel may represent a reversal of the direction of travel. A bidirectional vehicle may be equipped with lighting that changes to indicate the directionality of the vehicle. For example, a bidirectional vehicle may be equipped with a system to control the lights of the vehicle such that, in a first state, a first set of lights associated with one longitudinal end of the vehicle are illuminated with a white hue to indicate a front of the vehicle and a second set of lights associated with another longitudinal/opposite end of the vehicle are illuminated with a red hue to indicate a back of the vehicle. This may be inverted when the vehicle changes its operating direction by changing the lighting system to a second state illuminating the first set of lights with a red hue and the second set of lights with a white hue. In the case of a bidirectional vehicle, the light emitter array may be configured to output a first color (e.g., white, red, etc.) when the vehicle is traveling in a first direction and to output a second color different than the first color when the vehicle is travelling in a second direction that is opposite the first direction.

A vehicle such as the example vehicle 102 can be used to travel through the environment 100 and collect data. For example, the vehicle 102 can include one or more sensor systems 104. The sensor system(s) 104 can be, for example, one or more time-of-flight sensors, lidar sensors (e.g., lidar sensor 130), RADAR sensors, SONAR sensors, image sensors (e.g., image sensor 138), audio sensors, infrared sensors, location sensors, etc., or any combination thereof. Certain implementations described herein may be particularly well-suited for use with time-of-flight sensors, although other types of sensors also are contemplated. The sensor system(s) 104 may be disposed to capture sensor data associated with the environment. For example, the sensor data may be processed by a vehicle control system to identify and/or classify objects in the environment (e.g., trees, vehicles, pedestrians, buildings, road surfaces, signage, barriers, road markings, or the like and/or to navigate the vehicle 102 relative to such object(s)).

In some examples, the vehicle 102 can include one or more emitter systems (or adaptive light sources). An emitter system may include and/or be associated with a headlight, a light bar, light source disposed on a sensor housing or other location of a vehicle. The adaptive light source may comprise any number of light emitting elements that operate concurrently (e.g., in a group) or independently of each other. In some examples, a light emitter may be associated with an array of independently controllable light emitting elements and/or filters that are positioned in any number of rows and/or columns. In examples, the independently controllable emitters and/or filters may be associated with individual microcontrollers that enable individual light emitting elements to be controlled independently and/or in groups. In some examples, individual rows and/or columns of light emitting elements may be controlled by individual microcontrollers. In some examples, the microcontrollers can dynamically increase/decrease the amount (e.g., intensity) of light emitted by the light emitting elements within a range (e.g., by changing a frequency and/or duty cycle of the electrical signal driving individual light emitters, altering a voltage or current supplied to individual light emitters, and the like), cause the light emitting elements to emit light at different angles, cause light to be emitted in a particular shape, color, or light pattern, etc. In some examples, illumination intensity of individual light emitters can be altered by using pulse width modulation (PWM) or fixed width modulation (FWM) where the LED is rapidly switched on and off at a certain frequency. The brightness of an LED, for example, may be controlled by adjusting a duty cycle (the ratio of the on-time to the off-time) of the pulsing. Adjusting the PWM affects how quickly the LED pulses. Higher PMW frequencies can make the pulsing imperceptible to the human eye and the LED can appear as a continuous light, while lower PMW frequencies might result in noticeable flickering. In some examples, the brightness of individual light emitters can range from between 100% to 0% (where 0% is off) based on the changing the PWM. The independently controllable light emitting elements may be reconfigured in any number of light pattern configurations by controlling an illumination intensity of the emitted light, a direction of the emitted light, a focus of the emitted light, and/or control the emitted light such that one or more discrete beams of light are emitted.

The vehicle 102 may include one or more emitter systems, such as a first headlight 132A and second headlight 132B. By way of example and not limitation, an emitter system may include adaptive driving beam (ADB) headlights and/or a high-definition (HD) headlights. For instance, an adaptive HD headlight may comprise of an array of light emitting diodes (LEDs) or other light emitters arranged in a grid or other pattern and that can be granularly controlled by a central processor. Individual control of LEDs or groups of LEDs enables the autonomous vehicle to dynamically adjust the headlights based on the driving situation and environment, which can improve vehicle safety as well as pedestrians, other drivers, etc. Other technologies are contemplated, such as use of a polarizing filter (e.g., with multiple controllable zones), a digital micromirror device (DMD), Microelectromechanical systems (MEMS), a laser light source, micro-LED comprising a compact LED array, liquid crystal on silicon (LCoS), etc.

An individual headlight (e.g., first headlight 132A) may represent an emitter system that can be used to improve the accuracy of object detection, classification, and other perception tasks, particularly in bright or low-light environments, or during adverse weather conditions (e.g., when rain creates significant interference for lidar and radar sensors). A headlight may include an array of light emitters that includes multiple, independently controllable light emitting elements. Selectively controlling individual elements enables the vehicle to direct light to particular portions of an environment (e.g., to spotlight an object) while refraining from emitting light toward other portions of an environment (e.g., a retroreflective surface, an oncoming vehicle, etc.).

The independently controllable emitter elements may be configured to emit different light patterns according to various emitter configurations. In some examples, a light emitter may be controlled to vary a direction and/or focus of emitted light, and/or control the emitted light in multiple, separate beams or columns of light (e.g., by segmenting light into vertical and/or horizontal zones). For example, FIG. 1 depicts an example image captured by image sensor 138 after first headlight 132A and/or second headlight 132B have been configured to selectively emit columns of light (or zones of light) into the environment. The columns of light may include, e.g., a first column 136A, a second column 136B (associated with an oncoming vehicle 134A), a third column 136C, a fourth column 136D (e.g., associated with a first leading vehicle 134B), a fifth column 136E, a sixth column 136F (e.g., associated with a second leading vehicle 134C), a seventh column 136G, etc. Individual columns of light may correspond to groups of light emitting elements of a light emitter array.

An intensity, size, shape, etc. of the columns of light may be based at least in part on the detected objects in the environment, confidence scores associated with detected object(s) in the environment (e.g., increase an illumination intensity of one or more light emitting elements when a confidence score is at or below a threshold), predicted trajectories of objects (e.g., predicted trajectory of an oncoming vehicle, predicted trajectory of a bicyclist or pedestrian, etc.). In some examples, light from light emitters and/or filters may be redirected to avoid (or shine at a lower intensity) on highly reflective surfaces or objects (e.g., retroreflectors, license plate, street sign, etc.). For example, fourth column 136D and sixth column 136F may be associated with a lower illumination intensity relative to first column 136A, third column 136C, and seventh column 136G. Additionally or alternatively, in some examples, adaptive light sources may direct light (or an increased intensity of light) toward regions or objects in an environment that are less reflective, are associated with less reliable sensor data (e.g., due to low light conditions, or a high contrast), for redundancy, and/or other reasons.

In some examples, light emitters (or an otherwise adaptive and/or adjustable light source) may control the size, shape, focus, and/or position of the emitted light by moving or orienting individual light emitters themselves. Additionally or alternatively, in some examples adaptive light sources may use movable mirrors or other optics to steer the light emitted by the emitters to achieve the desired size, shape, focus, and/or position of the emitted light. These technologies can enable a headlight to emit light into one or more zones from the headlight and preclude emittance of light from one or more other zones.

The sensor system(s) 104 can include one or more processors 106 and memory 108 communicatively coupled to the processor(s) 106. The memory 108 can store processor-executable instructions executable by the processor(s) 106 to cause the sensor system(s) 104 and/or emitter configuration system 120 to perform functions that identify regions of interest in the environment 100 (e.g., objects in the environment that cause glare, an object that cannot be identified, a portion of the environment associated with a threshold number of unreliable pixels, etc.) and cause a light source to selectively emit light as detailed herein. The processor(s) 106 and/or the memory 108 may be physically integrated into the sensor system(s), e.g., as an SoC, FPGA, ASIC, or the like, or, in some implementations, the processor(s) 106 and/or the memory 108 may be available to, e.g., connected to receive signals from and/or send signals to, the sensor system(s) 104. As discussed above, the sensor system(s) 104 can determine the sensor data in various formats (e.g., a quadrature format, an intensity and depth format, and/or an unprojected format) using the processor(s) 106.

In the example of FIG. 1, the sensor system(s) 104 can also include an emitter system 110 and a receiver 112. The sensor system(s) 104 may include a time-of-flight sensor. Accordingly, the emitter system 110 may be configured to emit a carrier (e.g., a signal) and the receiver 112 may be configured to receive, e.g., capture, a response carrier (e.g., a response signal). The response carrier may be the carrier reflected off a surface in the environment 100 (e.g., an object such as road sign, a road surface, another vehicle, pedestrian, etc.). The time-of-flight sensor may be configured to determine sensor data in a quadrature format based on the carrier and the response carrier. In some instances, the sensor can measure a phase shift between the carrier and the response carrier and/or perform numerical integration calculation to determine the sensor data in the quadrature format (e.g., determining one or more of a quadrature from the response signal). In some implementations, the sensor can also determine an intensity and depth format of the sensor data, which may also be referred to as an intensity image and a depth image, respectively. For example, using the quadrature data, the sensor system can determine depth values and intensity values for each of a plurality of pixels representing a sensed environment and generate the depth and intensity images based on such values.

As detailed further herein, aspects of the emitter system 110 may be configurable. For instance, a modulation frequency and/or an intensity of the carrier emitted by the emitter system 110 can be altered. Moreover, the emitter system 110 may be configurable such that regions of a field of view illuminated by the emitter system 110 may be differently illuminated. In some examples, the emitter system 110 can include multiple emitters, e.g., an array of laser emitters, and the multiple emitters can be controlled individually (on, off, or gradations therebetween) or in subsets to differently illuminate the field of view. In one non-limiting example, a first emitter or first subset of emitters may have a reduced illumination (or no illumination) relative to a second emitter or second subset of emitters. Additional details of this example are provided herein, including in connection with FIG. 3, described below. In some instances, the illumination intensity associated with a carrier emitted by the emitter system 110 can be altered by adjusting the voltage and/or frequency input to the emitter system 110. In other examples, the emitter system 110 can include a projection system that alters the carrier signal. In some examples, the emitter system 110 can include a liquid crystal display (LCD) or other mask having selective opacity. For instance, emitted carrier(s) may pass through the LCD, and pixels of the LCD can be driven to selectively allow or inhibit passage of the carrier therethrough. Also in examples, an integration or exposure time of the receiver 112 may be altered, e.g., by controlling an amount of time over which the receiver 112 collects response carriers.

Selectively altering the illumination power and/or the integration time can tune the sensor system(s) 104. For instance, techniques described herein may be useful to increase or reduce the illumination intensity proximate areas of the field of view including a region(s) of interest (e.g., oncoming traffic, highly-reflective objects, including but not limited to retroreflectors and/or objects close to the sensor system(s) 104, etc.). Lower intensity illumination and/or shorter integration times can result in increased performance in these areas, e.g., because oversaturation is less likely with reduced illumination. Conversely, higher intensity illumination and/or longer integration times can result in increased performance in relatively lower ambient light environments and/or when the response carrier is from farther-away objects and/or objects having lower reflectivity.

As also illustrated in FIG. 1, the sensor system(s) 104 may be configured to output generated data as sensor data 114. For example, the sensor data 114 can include quadrature values, intensity and depth information, a point cloud, or the like. In the illustrated example, the sensor data 114 can include phase frames 116 and/or image frames 118. As noted above, the emitter system 110 emits a carrier and the receiver 112 receives a response carrier. In examples, the carrier may be amplitude-modulated light and the response carrier will have a phase shift relative to the carrier. Upon receipt at the receiver 112, the response carrier includes a phase value. Such values may be included in the phase frames 116. The sensor system(s) 104 may compute intensity and/or depth values based at least in part on phase values of a plurality of phase frames, e.g., four phase frames 116. The intensity and depth values calculated using the phase frames 116 can be embodied as the image frames 118. The image frames 118 can include a stream of serially-generated (e.g., at a predetermined interval) image frames 118. Generally, each of the image frames 118 may include the same type of data, e.g., data related to the intensity and depth for each of a plurality of pixels comprising the receiver 112 of the sensor. Specifically, the image frames 118 can include a depth image and an intensity image generated by the sensor system(s) 104 and representative of a portion of the environment 100. Similarly, other instances, e.g., frames, of the image data can include both an intensity image and a depth image representative of the environment 100 at the corresponding sensing time. Sensor data 114 may also include lidar data received from a lidar sensor(s) (e.g., lidar sensor 130) including intensity data and/or pulse data associated with different times.

As noted above, different attributes of the environment 100 can result in degraded sensor data quality or unreliable sensor data. For instance, ambient light, e.g., sunlight, may have the same or a similar wavelength as illumination light emitted and thus, can be perceived at pixels of the receiver 112 of the time-of-flight sensor as returns, despite not corresponding to emitted light. In high ambient light conditions, sunlight, in combination with light emitted by a light emitter can result in oversaturation of pixels. Moreover, highly reflective objects and/or objects that are extremely close to the sensor can result in stray light and/or glare that can adversely impact pixel quality. To provide another example, sensor data in low light environments may result in small pixel values and low signal-to-noise ratio. Techniques described herein can use the phase frames 116 and/or the image frames 118 to determine settings (or configurations) associated with an emitter system (e.g., to reduce the impact of environmental factors, including those just described, on pixel quality). Controlling aspects of the emitter system 110 can provide an improved dataset that may better represent the environment and/or may have a higher associated confidence.

As illustrated in FIG. 1, an emitter configuration system 120 may be configured to receive the sensor data 114 generated by the sensor system(s) 104. In more detail, the emitter configuration system 120 can include a pixel evaluation component 122, an object location determination component 124, and/or one or more machine learned model(s) component 126. For clarity, the emitter configuration system 120 (and its components) are illustrated separate from the sensor system(s) 104. However, portions of the emitter configuration system 120 may be implemented on the sensor system(s) 104. By way of non-limiting example, the processor(s) 106 may be configured to execute actions associated with the pixel evaluation component 122, the object location determination component 124, and/or the machine learned model(s) component 126.

The pixel evaluation component 122 may be configured to determine reliability of data associated with individual pixels (e.g., to determine whether data associated with a pixel is "good" or "bad," reliable or unreliable, or otherwise). In at least one example, the pixel evaluation component 122 can determine whether pixels are saturated, e.g., from intensity information in the image frames 118. For instance, saturated pixels may have an intensity of 1 or an intensity that otherwise corresponds to a predetermined, e.g., maximum, value of the sensor. The pixel evaluation component 122 may also or alternatively use the phase frames 116 to determine the unreliable pixels. As noted above, the phase frames 116 can include phase values associated with the response carrier. The response carrier is expected to have properties or characteristics based on the shape of the carrier. In one example, the phase values associated with four phase frames should add to zero. Moreover, for four consecutively captured phase frames, the sum of (i) the difference between the third and the first phase values and (ii) the difference between the fourth and the second phase values should also equal zero. When the phase values for individual pixels do not conform to these properties, the pixel evaluation component 122 can identify the pixel as unreliable.

The pixel evaluation component 122 can also look to the image frames 118 to determine whether pixels are reliable or not. In examples, the pixel evaluation component 122 can determine whether data associated with a pixel is inaccurate (e.g., not enough light is received at the pixel, an abundance of light received at the pixel, etc.). In some examples, the pixel can be indicated as saturated (e.g., as having an intensity over a threshold value). In other examples, however, the pixel may not be saturated, but may still be unreliable. For instance, the pixel may include two photon wells. In these examples, a difference between the number of photons in the wells can be associated with an intensity of the pixel. When both wells are saturated, the difference will be zero and the pixel will be readily identified as oversaturated or overexposed. However, when only one of the wells is oversaturated, a difference can be non-zero, despite the measurement being unreliable. The pixel evaluation component 122 can also determine these unreliable pixels (e.g., by confirming that phase values of the phase frames follow certain rules).

As illustrated in FIG. 1, the emitter configuration system 120 may also include the object location determination component 124. In more detail, the object location determination component 124 can determine a location of one or more objects in the field of view of the sensor system(s) 104. For instance, the object location determination component 124 can receive the sensor data 114 and identify one or more objects from the image frames 118, and/or lidar data. In some examples, the presence and/or position of an object may be associated with a group of unreliable pixels (e.g., saturated pixels or underexposed pixels). In other examples, the object(s) may be identified from the sensor data 114 as groups of pixels having the same intensity or same depth. In some examples, the object(s) may be identified from analysis of point cloud data (e.g., grouping points that are close together to form clusters representing different objects or surfaces). For example, the amount of light reflected from an object surface can vary based at least in part on material, color, texture, etc. of the object.

In at least some examples, the object location determination component 124 can receive additional data and determine the presence and/or location of the objects from this information. Such additional data may be from one or more additional sensors (e.g., of the same or different modality). Also in examples, the additional data can be received from a perception system or other system associated with the vehicle 102. The vehicle 102 may include a perception system configured to generate a bounding box, classification data, or the like (e.g., from one or more sensor modalities, to indicate objects in the environment 100). Such information may be received by the emitter configuration system 120. In other examples, the vehicle 102 may also or alternatively include a planning system, a tracking system, or the like, which may include functionality to identify the existence and/or location of objects in the environment 100.

As noted, the object location determination component 124 can determine object location(s) in the field of view of the sensor system(s) 104 having the unreliable pixels (e.g., saturated pixels or underexposed pixels). In some examples, the object location determination component 124 may determine the position of the object in a frame of reference unique to the sensor data 114 (e.g., instead of a global coordinate system).

The emitter configuration system 120 can also include a machine learned model(s) component 126. The machine learned model(s) component 126 may be configured to store one or more machine learned model(s). In some examples, the machine learned model(s) may be trained on a remote computing device separate from the vehicle 102. Further details regarding training of the machine learned model(s) is discussed in relation to FIG. 7 below. The machine learning model is configured to receive one or more of sensor data, pixel evaluation data, object data (e.g., classification, confidence scores associated with object detection, location, distance, etc.), environmental data (e.g., map data, weather data, date/time data, etc.) and output configuration signals 128. The configuration signals 128 can control aspects of the sensor system 104 to implement the determined change in emitter system 110 (e.g., increase or decrease individual light emitting elements associated with one or more emitter systems, such as first headlight 132A and/or second headlight 132B). In some examples, multiple configuration signals may be generated for emitter systems that are intended to emit light in conjunction. For example, first headlight 132A, second headlight 132B, etc.

The machine learned model(s) component 126 can include any models, algorithms, and/or machine learning algorithms. As described herein, an exemplary neural network can pass input data through a series of connected layers to produce an output. Each layer in a neural network can also comprise another neural network or can comprise any number of layers (whether convolutional or not). As can be understood in the context of this disclosure, a neural network can use machine learning, which can refer to a broad class of such algorithms in which an output is generated based on learned parameters.

Machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The emitter configuration system 120 may generate one or more configuration signals 128 (e.g., to control aspects of the sensor system(s) 104 to implement the determined change in emitter system 110). For example, the emitter system configuration signal(s) 128 can instruct a change in voltage and/or current supplied to one or more emitters of the emitter system 110, a change in duty cycle, a change in a projection system associated with the emitter system 110, and/or a change in an LCD or a mask associated with the emitter system 110. In some examples, the configuration signal can indicate a number of light emitters from which to emit light (e.g., emit light from 15%, 33%, 50%, 95%, etc. of the total number of light emitters in the emitter system). The emitter configuration system 120 can output the configuration signal(s) 128 to the sensor system(s) 104 (e.g., to the emitter system 110 and/or the receiver 112). The sensor system(s) 104 may then generate a next iteration of the sensor data 114 with the sensor system(s) 104 reconfigured according to the emitter system configuration signal(s) 128. As will be appreciated, dynamically changing illumination of one or more regions of a field of view of a sensor in accordance with techniques described herein can improve the detection of objects in low lit environments as well as reduce the effects of glare in subsequent frames. In one example, by dynamically increasing and/or reducing illumination power at regions of a field of view of a time-of-flight sensor corresponding to certain objects, reliability of pixels in the sensor data can be improved, thereby allowing for better recognition of objects.

The emitter configuration system 120 can generate configuration signals 128 based on pixel information generated by the pixel evaluation component 122, object location information generated by the object location determination component 124, and/or the machine learned model component 126. By way of non-limiting example, the emitter configuration system 120 can determine whether to alter the illumination intensity of light emitted by the emitter system 110. In at least some instances, the machine learned model component 126 can determine whether to reduce illumination intensity at regions proximate the location of object(s) determined by the object location determination component 124. For example, the emitter configuration system 120 can determine to increase or reduce illumination intensity proximate objects when the pixel evaluation component 122 indicates that pixels around that object are unreliable and maintain the illumination intensity at other areas of the field of view. For instance, the illumination intensity may be decreased when at least one pixel of all pixels proximate the object is saturated or unreliable, a ratio of saturated/unreliable pixels to unsaturated/reliable pixels or total pixels proximate the object meets or exceeds a threshold ratio, a number of saturated/unreliable pixels meets or exceeds a predetermined number of saturated/unreliable pixels, or the like.

In some instances, the emitter configuration system 120 may also use additional information to determine whether and how to reconfigure the sensor system(s) 104. By way of non-limiting example, the emitter configuration system 120 can receive additional information, such as classification information, identification information, segmentation information, or the like which may provide additional detail about a detected object. In at least one example, the emitter configuration system 120 can determine from such additional information that the identified object is an oncoming vehicle and may determine to reduce the illumination intensity proximate the oncoming vehicle (e.g., preemptively so as to avoid potentially blinding a driver of the oncoming vehicle). The emitter configuration system 120 may determine that the identified object is poorly lit (e.g., due to being in a low-lit environment) and may determine to increase the illumination intensity proximate the poorly lit object. In at least one example, the identified object is a highly-reflective object (e.g., a street sign, a license plate, or other known highly-reflective object) and may determine to reduce the illumination intensity proximate that object, (e.g., regardless of whether data associated with the object is deemed unreliable or saturated). These and other examples are discussed further below.

In some examples, the emitter configuration system 120 can generate a configuration signal configured to alter the configuration of an emitter system for a predetermined period of time (e.g., 1 second, 2 seconds, etc.). That is, the emitter configuration system 120 may selectively enhance or decrease the illumination intensity at a particular region in the environment in order to capture additional sensor data over that predetermined period of time (e.g., for confirmation of a detected object, redundancy, to enable the capture of additional image data in that predetermine period of time, etc.). The redundancy can enhance reliability of sensor data, improve safety, and/or accuracy.

Figure 2A:
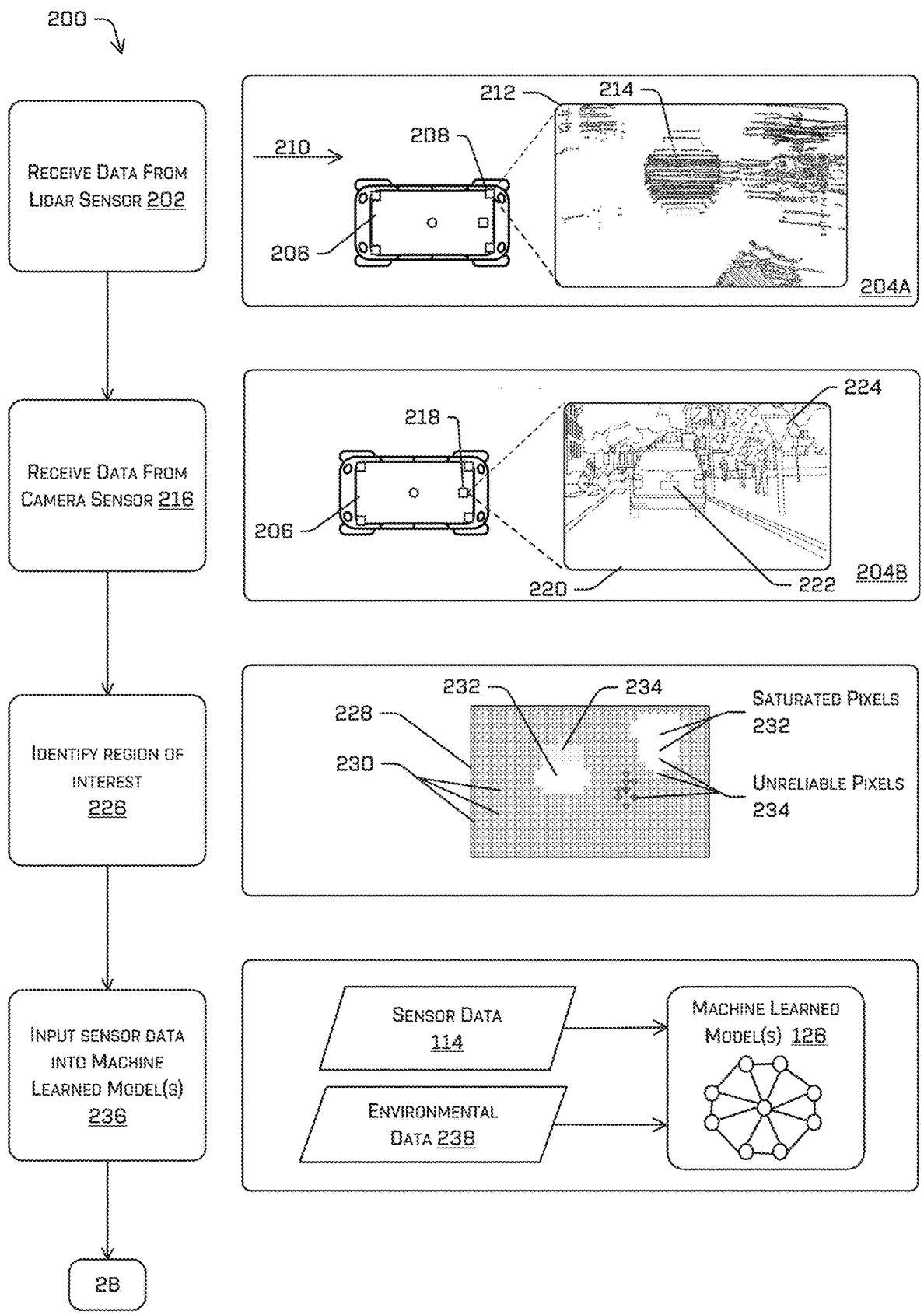
FIGS. 2A and 2B illustrate textual and pictorial flow charts of an example process for configuring an emitter system, such as a vehicle headlight, to alter light emission, as described herein.
Figure 2B:
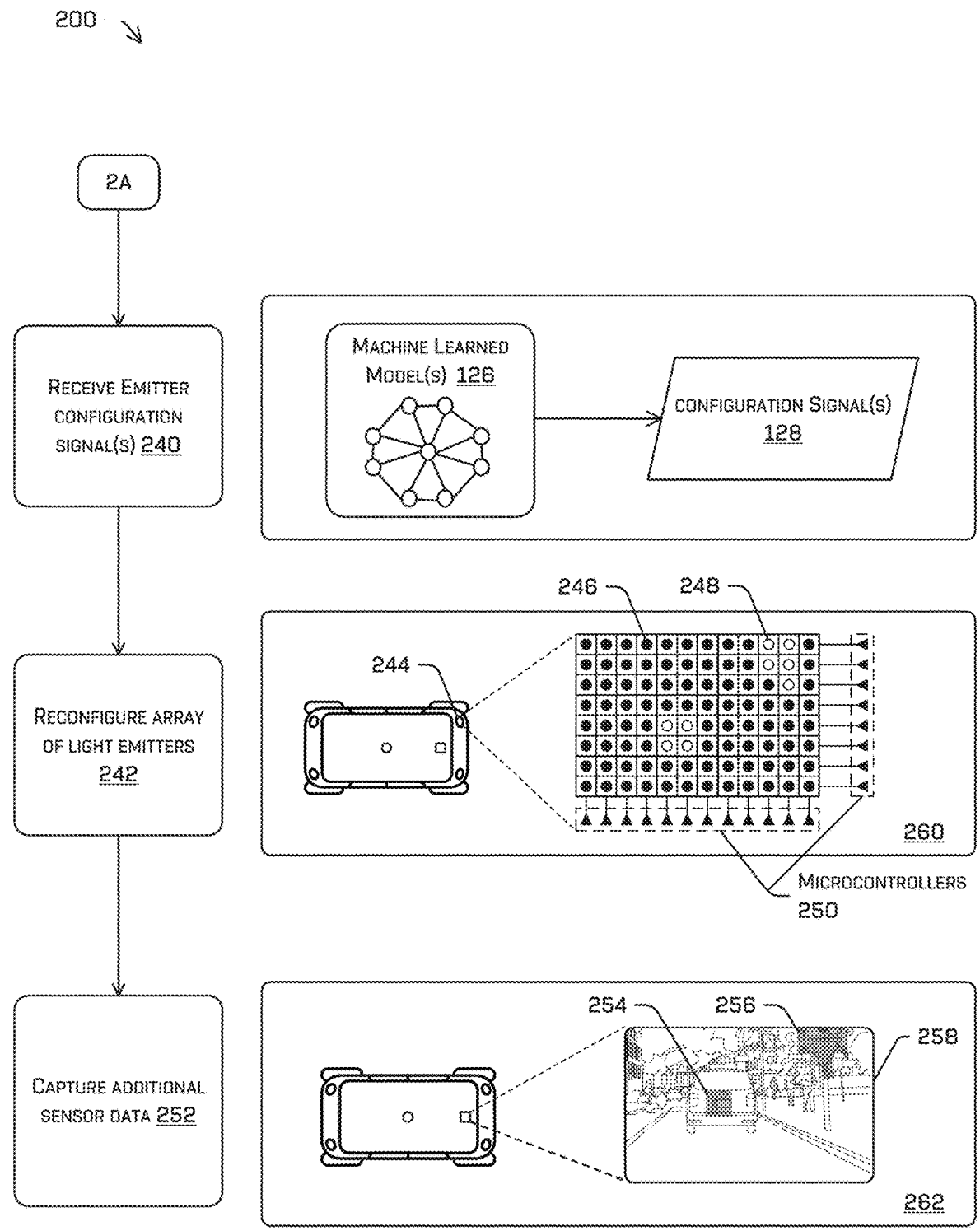

FIGS. 2A and 2B illustrate textual and pictorial flow charts of an example process 200 for configuring an emitter system, such as a vehicle headlight, to alter light emission, as described herein. For example, the process 200 can be implement using components and systems illustrated in FIG. 1. And described above, although the process 200 is not limited to being performed by such components and systems. Moreover, the components and system in FIG. 1 are not limited to performing the process 200. Additionally, modifications to process 200 are also contemplated. By way of non-limiting example, in some instances, the emitter system can be reconfigured in the absence of determining that pixels are unreliable (e.g., in anticipation of an oncoming vehicle, for redundancy, in an anticipated of glare from a reflective surface, etc.). Furthermore, though process 200 describes receiving both lidar data and image data prior to reconfiguring the emitter system, a configuration signal may be generated based in part on receiving one of these types of sensor data and not the other (e.g., lidar data and not image data or vice versa) or based on receiving other types of data alternative to or in addition to the sensor data (e.g., map data).

In some examples, the process 200 can include an operation 202 that includes receiving data from a sensor associated with (e.g., a sensor on the vehicle or a sensor remote from the vehicle that can send data to the vehicle) the vehicle 206. The sensor data can be received from a sensor of a first modality. For example, the lidar data may be received from a lidar sensor 208. An example 204A accompanying the operation 202 illustrates a vehicle 206, which may be the vehicle 102 in some examples. A lidar sensor 208 is mounted on the vehicle 206, e.g., to sense a portion of an environment surrounding the vehicle 206. For instance, the lidar sensor 208 may be arranged to sense objects generally in a direction of travel 210 of the vehicle 206, although the sensor may be otherwise disposed and more sensors than the one illustrated may be present. In the illustrated embodiment, the lidar sensor 208 is configured to emit laser pulses into the example that bounce off objects and return to the sensor (or receiver). The time it takes for the laser to return is used to calculate the distance between the sensor and the object, providing a distance to various points in the environment. Lidar data may also provide angular data (e.g., a lidar sensor can record the angle at which a laser pulse was emitted and the corresponding return angle). In some examples, a point cloud 212 may be generated based in part on the lidar data received from lidar sensor(s). In some examples, intensity of the reflected laser pulses may indicate presence of different objects, materials, and/or surfaces in the environment. In some instances, intensity data 214 may be utilized to determine a point of interest in the environment. In the particular example, the intensity data 214 may indicate a location of a reflective object in the environment (e.g., reflective surfaces produce a higher intensity return signal compared to non-reflective surfaces).

At operation 216, the process 200 may include receiving data from a sensor of the same or different modality. For example, the process may include receiving additional lidar data from the same or different lidar sensor (e.g., lidar sensor 208 or a different lidar sensor on the vehicle). Additionally or alternatively, the process 200 may include receiving data from a sensor of a different modality, such as a camera sensor, thermal sensor, microphone, time-of-flight sensor, or any other type of senor (or senor modality) as discussed throughout the disclosure. As illustrated in FIG. 2A, image data is received from an image sensor 218. The image sensor 218 is configured to image a field of view 220 corresponding to a region of an environment of the vehicle 206, which may be a portion of the environment 100. As illustrated, the field of view 220 can include a leading vehicle, a portion of a road (on which the vehicle 206 is also travelling), a portion of a sidewalk adjacent the road, and various other objects, including a road sign 224. As also illustrated, the leading vehicle can include a license plate 222. As detailed further herein, the road sign 224 and the license plate 222 may be examples of identified region of interests due to being highly-reflective objects that may result in glare, which can affect the quality of sensor data.

In the example 204B, an emitter system associated with the vehicle 206 (e.g., first and second headlights located at the leading end of the vehicle) may be configured to illuminate the field of view 220 with a constant illumination intensity. That is, the emitter system(s) may emit a constant carrier signal across an entirety of the field of view.

At an operation 226, the process 200 may include identifying one or more regions of interest. A region of interest may be a portion of an environment or field of view of a sensor (e.g., image sensor, time-of-flight sensor, etc.). The region of interest may be associated with an object. The object may be a poorly lit or blurry object captured in sensor data (e.g., a dog on a dimly lit road), a reflective surface of an object (e.g., water on the road or other wet surface, street signs, etc.), headlights of an oncoming vehicle, taillights of a leading vehicle, or otherwise any other portion of the environment. In some examples, a region of interest may correspond to a portion of sensor data associated with unreliable pixels. As detailed herein, unreliable pixels may include pixels that are oversaturated, underexposed, and/or unreliable because of the influence of glare. An example accompanying the operation 226 provides a more detailed illustration. Specifically, the example includes a visual representation 228 of the sensor data received by a sensor of the vehicle. The visual representation 228 includes an array of pixels 230 collectively representative of a field of view (e.g., field of view 220). The visual representation 228 may be representative of an intensity image, e.g., in which an intensity (e.g., brightness) of sensed objects in the scene is represented on a pixel-by-pixel basis. In the representation 228, relatively lighter of the pixels 230 may represent higher intensities, whereas relatively darker of the pixels 230 may represent lower intensities. In this example, some of the pixels 230 are white, representing saturated pixels 232. Other of the pixels 230, e.g., proximate the saturated pixels 232 may be near-white, and can represent unreliable pixels 234. Still further, other pixels are dark or near-black indicating pixels that are underexposed (e.g., due to low light condition, insufficient light is reaching the sensor, incorrect sensor setting, obstruction blocking light such as debris, high dynamic range environment with wide range of brightness levels, etc.). In some examples, some of the unreliable pixels 234 may include effects of glare, for instance, but may not be completely saturated. In some examples, the saturated pixels 232 and/or the unreliable pixels 234 may be identified as pixels having an intensity equal to or above a threshold (e.g., a relatively high threshold) and/or pixels as having an intensity equal to or below a threshold (e.g., a relatively low threshold).

In some examples, a region of interest may be associated with a detected color in the environment, and/or based on a color threshold being met or not being met. A sensor on the vehicle, such as an image sensor, can often rely on adequate lighting to capture data. In a low-lit environment, the sensor can have difficulty with identifying colors and/or distinguishing between colors. In some examples, a region of interest may be associated with detecting a particular region in the environment (or particular region in a field of view of a sensor, point cloud, etc.) associated with a darker color (e.g., black, dark blue, dark green, purple, red, etc.). In some instances, a machine learning model or other processing technique may be used to determine whether a portion of image data satisfies a color threshold (e.g., whether the color satisfies a vibrancy threshold and is more/less muted, diminished or otherwise washed out) and/or to determine whether there is sufficient contrast between two or more colors (e.g., a boundary between two colors is below a threshold), etc. To provide a non-limiting example, a region of interest may be associated with a region of a field of view of a sensor that indicates an object in the environment is associated with a dark color (e.g., a black dog on the side of the road, a pedestrian wearing a purple shirt/pants, etc.). In this example, the sensor data can be input into machine learned model(s) component 126. The machine learned model(s) component 126 may generate a configuration signal that controls an emitter system(s) of a vehicle (e.g., one or more headlights) to alter the light that is emitted into the environment (e.g., alter an intensity of light, light pattern, direction of the light, etc.). For example, the configuration signal can cause the emitter system(s) to selectively increase an illumination intensity of one or more light emitters at a location in the environment associated with the dark color or proximate the location of the dark color (e.g., at the feat of a pedestrian) and/or can increase a number of light emitters of the emitter system(s) that emit light. In some examples, the configuration signal can increase the illumination intensity of one or more light emitters by causing a microcontroller(s) to increase the duty cycle of the one or more light emitters.

In the representation 228, the saturated pixels 232 correspond generally to one of the road sign 224 or the license plate 222 while the underexposed pixels correspond generally to one or more pedestrians walking on the sidewalk. As noted above, the road sign 224 and the license plate 222 may be examples of objects that are highly-reflective and thus may be a source for glare, which, in this example, can result in saturated and/or unreliable sensor data. Similarly, in the representation 228 the unreliable pixels 234 are proximate the saturated pixels 232, as the unreliable pixels 234 may be affected by glare that is causing saturation of the saturated pixels 232. Although in the representation 228 all of the pixels 230 that are not saturated pixels 232 or unreliable pixels 234 are indicated as having the same color (and thus the same intensity), this is for ease of illustration only. In actuality, the intensity at each of the pixels 230 (and therefore the color) will vary based on the object sensed in the environment. The process 200 may include identifying positions of objects in the field of view based in part on identifying a region of interest. For example, the operation 226 can include determining the location of the road sign 224 and the license plate 222 in the field of view 220.

At operation 236, the process 200 may include inputting sensor data into a machine learned model (or machine learned model component 126) configured to generate configuration signals based at least in part on receiving sensor data (e.g., sensor data 114) and/or environmental data 238. Environmental data 238 can include, for example, map data, weather data (e.g., precipitation data indicating rain, snow, sleet, hail, etc.), humidity data (which can indicate potential fog, precipitation, road traction, or otherwise reduced visibility), temperature data, wind speed and/or wind direction, time/date data (e.g., time of day, a day of the week, season), etc. Environmental data may further be used to optimize generation of configuration signals. For example, in the case of environmental data indicating presence of fog, a configuration signal can be generated to adjust the beam pattern and/or illumination intensity of an emitter system in order to reduce glare caused by light reflecting off water particles in the air. In some examples, the process 200 may include inputting sensor data associated with just the region of interest into the machine learned model (e.g., to decrease computational load or minimize computing resource usage). That is, sensor data associated with just a portion of the environment and/or portion of a field of view of a sensor may be input into the machine learned model, for example.

At operation 240 (illustrated in FIG. 2B), the process may include receiving, as output from the machine learned model (or machine learned model(s) component 126) a configuration signal(s) 128. In some examples, the machine learning model(s) component 126 may generate a grid including a grid of spaces corresponding to a field of view (e.g., field of view 220). The grid may include an array of spaces arranged in a number of rows and columns. The spaces can correspond in number and location with the number and location of the pixels 230. In other instances, and as detailed further herein, the number and arrangement of the spaces may correspond to individually controllable regions of the emitter system.

In some examples, the machine learned model(s) component 126 component can output a first configuration signal to a first emitter system (e.g., a first headlight) and a second configuration signal to a second emitter system (e.g., a second headlight proximate the first headlight). The first and second configuration signals may or may not be the same. For instance, an object may be detected on one side of a vehicle (e.g., far left side) and the illumination pattern for the left headlight may be altered (e.g., to increase or decrease an illumination intensity of a region at or proximate the object) while the illumination pattern for the right headlight may not be altered or may be altered differently than the left headlight (e.g., the illumination pattern may be minimally altered due to the object being located on the far side of the vehicle).

The machine learning model(s) component 126 can determine a location of objects in the grid. More specifically, the machine learning model(s) component 126 can determine locations associated with objects and the reflection off of which is causing the unreliable pixels. In the example of FIG. 2A, the road sign 224 and the license plate 222 are the sources of pixel saturation. Accordingly, a first area of the grid associated with the road sign, and a second area associated with the license plate may be identified. In at least some examples, the vehicle 206 can include functionality to identify objects in image data, e.g., using image processing, segmentation, classification, and/or other techniques, and may map positions of objects detected using such techniques into the field of view 220 and/or the grid.

The positions of the road sign 224 and the license plate 222 may be determined in a number of ways. In some instances, the areas in the grid can be identified using the sensor data received at the operation 202. For instance, the areas may include all regions of the grid that include a saturated pixel, underexposed pixel, or unreliable pixels. The grid may include a number of an array of spaces corresponding to a number of microcontrollers associated with the emitter system.

At an operation 242, the process 200 may include reconfiguring the emitter system to increase illumination intensity of a first portion of the light emitters and/or decrease the illumination intensity of a second portion of the light emitters (e.g., proximate the objects). For example, an emitter system allows for selective illumination of portions of the field of view 220. For example, the emitter system can include an array of individually addressable light emitters, a projection system, and/or a configurable mask that allows for different illumination intensities. In the particular example, the operation 242 includes reconfiguring the emitter system to reduce illumination proximate a first area and a second area identified as including highly-reflective objects.

An example 260 accompanying the operation 242 illustrates a reconfigured emitter system 244. The emitter system 244 includes light emitters that have been reconfigured by microcontrollers 250 to the illumination intensity based on the configuration signal (e.g., of a portion of the light emitters have been decreased). For example, a first light emitter 246 may have been reconfigured to illuminate at a first illumination intensity and a second light emitter 248 may have been reconfigured to illuminate at a second illumination intensity different than the first illumination intensity. Though the illustrated example depicts light emitters having two color intensities (e.g., white and black), this is merely illustrative and the intensity of individual light emitters can vary.

At operation 252, the process 200 includes capturing additional sensor data in the environment. For example, additional image data may be received subsequent to the array of light emitters being reconfigured to emit light of a different light pattern into the environment. As illustrated in example 262, a first area 254 corresponding to license plate 222 and the second area 258 corresponding to the road sign 224 are grayed out relative to the remainder of the field of view to illustrate that the illumination intensity has been decreased at those regions. That is, the reconfigured emitter system has been controlled to reduce the illumination intensity at those areas relative to the rest of the field of view. By reducing the illumination intensity in this manner, a next iteration of captured sensor data may more reliable (e.g., have a reduced number of saturated or unreliable pixels).

In some examples, environmental data may include data captured by a microphone (or acoustic sensor) associated with the vehicle. For example, a microphone on the vehicle may capture audio data from an environment surrounding the vehicle (or from within the vehicle). Audio data can be processed to identify particular sounds such as sirens, horns, or other types of sounds associated with an emergency vehicle (e.g., ambulance, fire truck, police car, etc.), other vehicles, pedestrians, animals (e.g., dog, cat, cow, etc.). In some examples, depending on a direction and distance of the sound from the vehicle, audio data may be captured sooner than other types of sensor data (e.g., prior to receiving related image data of an animal that made the sound, or emergency vehicle, etc.). To provide one non-limiting example, a vehicle may capture audio data of a human voice in the environment. The audio data may be associated with a region of interest in the environment (e.g., a bottom left side of the vehicle). Additional sensor data may or may not be received in addition to the audio data (e.g., an injured person may be partially hidden from the view of an image sensor and/or not detected in image data). In this particular example, a configuration may be generated that causes an illumination intensity of a portion of the light emitters corresponding to the region of interest (i.e., a direction of the sound) to increase.

Figure 3:
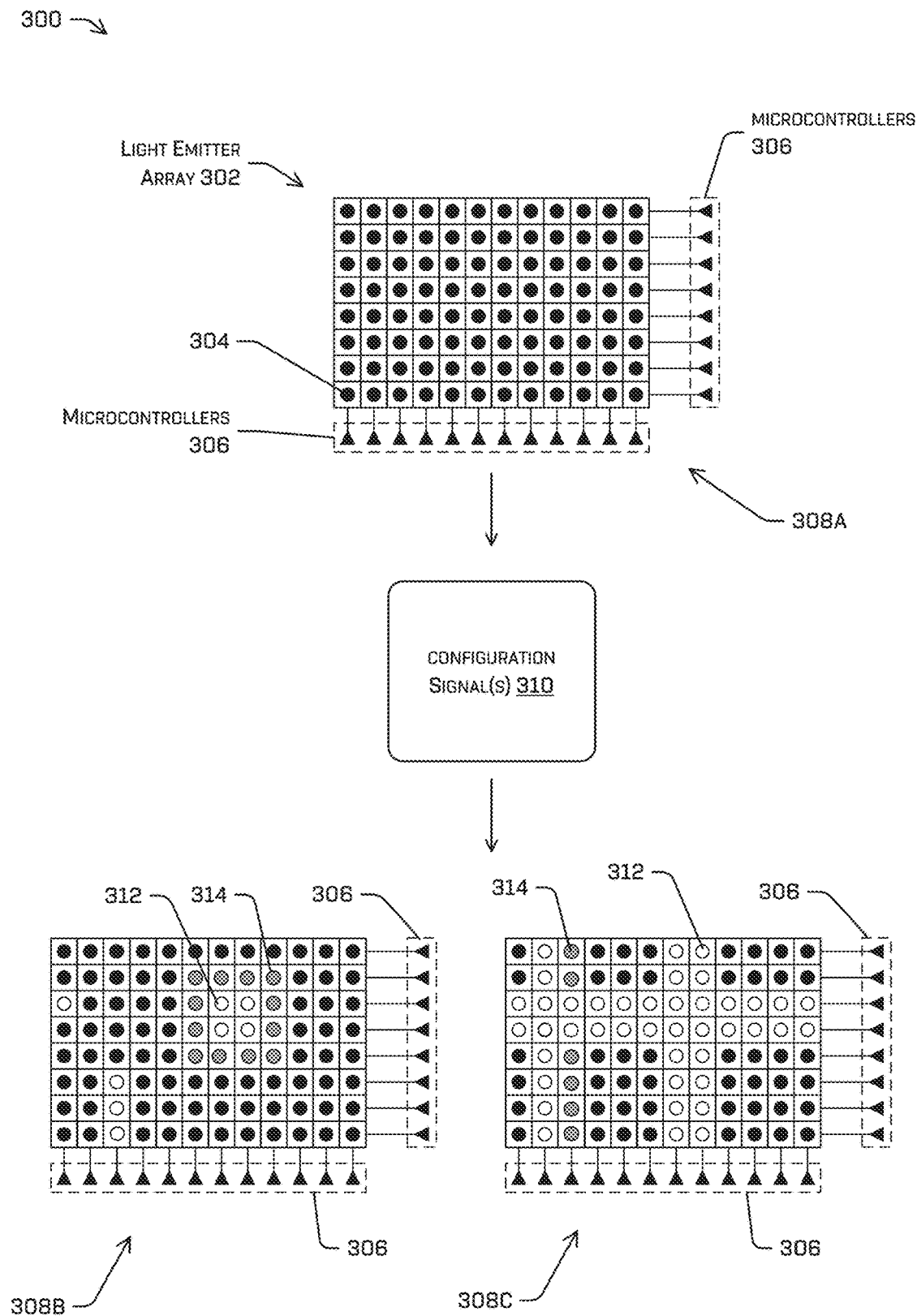
FIG. 3 illustrates aspects of an example emitter system and configurations thereof for altering illumination of an environment, as described herein.

FIG. 3 illustrates aspects of an example emitter system 300, which may be a part of a sensor system, such as a time-of-flight sensor system. The emitter system 300 may be an example of the emitter system 110, which may form a part of the sensor system(s) 104. In some examples, the emitter system may be associated with a HD or ADB headlight of an autonomous vehicle. In more detail, the emitter system 300 includes a light emitter array 302 (or matrix) including a plurality of individual light emitters 304. The light emitters may be controlled independently using, for example, microcontrollers 306, enabling the light emitter system to create complex light patterns.

In examples, the light emitters 304 may be vertical cavity surface emitting lasers (VCSELs), although the light emitters may be other types of light sources, including but not limited to light emitting diodes (LEDs), laser emitters (e.g., laser Diodes), or the like. Although the light emitter array 302 is illustrated as including eight rows and twelve columns, more or fewer rows and/or columns of light emitters 304 may be used. Moreover, this disclosure is not limited to an array including rows and columns. The light emitter array 302 may take different configurations. As also illustrated schematically in FIG. 3, the emitter system 300 includes a number of microcontrollers 306. The microcontrollers 306 may be configured to signal the light emitters 304 to emit light therefrom at a particular illumination intensity. In some examples, the microcontrollers 306 may control the light emitters 304 in a binary manner (e.g., such that the light emitters 304 are either on or off). In such an example, individual light emitters may be associated with individual shutters (or masks) or adjustable mirrors that shape the light beam, block and/or redirect portions of the light. In other instances, the microcontrollers 306 can increase or decrease the amount of light emitted by the light emitters 304 within a range (e.g., by altering an applied voltage or current).

In the example of FIG. 3, the light emitter array 302 is shown in a first configuration 308A, in which each of the light emitters 304 is configured in the same manner. Accordingly, the light emitter array 302 will provide substantially constant illumination across a field of view of the sensor including the emitter system 300. As also shown in FIG. 3, the light emitter array 302 may receive a configuration signal 310. For example, the configuration signal 310 can be one of the emitter system configuration signals 128 discussed above.

In response to the configuration signal, the microcontrollers 306 may control the light emitter array 302 to alter an emission from one or more of the light emitters 304 (e.g., change the illumination intensity and/or pattern of emitted light). For example, the configuration signal may be generated in response to determining an area in a field of view is associated with underexposed pixels, an area in the field of view of the sensor for which sensor returns are saturated and/or in which a highly-reflective object is detected, or when the sun is a low position in the environment. In some examples, a configuration signal may be generated due to a low confidence score associated with a detected object in the environment. In some examples, a configuration signal may be generated in response to detecting an oncoming vehicle in an adjacent lane (i.e., the oncoming vehicle approaches from an opposite direction on a straight or curved road).

In the example of FIG. 3, the object may be located in the field of view such that the light emitters 304 directly above and to the right of a center of the light emitter array 302 illuminate the object. In this example, the reconfiguration signal may cause the microcontrollers 306 to reconfigure the light emitter array 302 in a second configuration 308B. In the second configuration 308B, twenty of the light emitters 304 are shown as reconfigured light emitters 312 (e.g., as hollow circles or gray circles). The reconfigured light emitters 312 may have a different illumination intensity (increased or decreased) relative to the other light emitters 304 in the light emitter array 302 (and relative to the illumination intensity of those emitters in the first configuration). In this example, the reconfigured light emitters 304B may be aligned such that a carrier signal therefrom is directed at a point of interest in the environment (e.g., an object in the environment such as a street sign, vehicle, pedestrian, cyclist, animal, etc.). By altering the illumination intensity from the reconfigured light emitters 312, subsequent sensor data may be associated with a higher confidence score (e.g., in the case where an object in the environment is associated with a confidence score at or below a threshold). Altering the illumination intensity can improve visibility to other vehicles in the environment as well (e.g., decreasing oncoming traffic is exposed too, while also improving visibility to other vehicles, pedestrians, etc. in the environment). An illumination intensity may be selectively increased to highlight pedestrians, obstacles, animals on the road, etc.

In the second configuration 308B, the illumination intensity of only twenty of the light emitters (light emitters 314 and light emitters 314) have been altered. However, altering the illumination intensity of the light emitters 304 as shown may require that each of the light emitters 304 be individually addressable. That is, individual light emitters may be associated with individual microcontrollers 306. In some instances, a microcontroller may be configured to control a portion of light emitters (e.g., four light emitters, a row of light emitters, a column of light emitters, etc.).

FIG. 3 also illustrates the light emitter array 302 in a third configuration 308C. In the third configuration 308C, each of the microcontrollers 306 may be configured to control the light emitters in sections or portions (e.g., an entire row or entire column of the light emitter array, or a sub-array, e.g., a 2×2 or 3×3 array). For example, in the third configuration 308C, the microcontrollers can reconfigure the light emitters 304 in the rows and columns. While it may be desirable to alter the illumination intensity of individual light emitters 304 as shown in the second configuration 308B, controlling sections or portions of light emitters with a microcontroller can drastically reduce the number of microcontrollers 306 required by the emitter system 300.

In other examples, the emitter system 300 can include more than one of the light emitter array 302. For instance, the emitter system 300 can include two instances of the light emitter array 302 (e.g., a first light emitter array and a second light emitter array). The first light emitter array (e.g., a first headlight) and the second light emitter array (e.g., a second headlight) may be configured such that corresponding pixels in the light emitter arrays illuminate the same region of the field of view.

In some examples, the emitter system 300 may include a liquid crystal display (LCD) configured to alter light output by the light emitter(s). The light emitter(s) may include any light source(s) capable of illuminating a field of view. The LCD may be arranged between the light emitter(s) and the environment to be illuminated and may be selectively controlled to affect light passing therethrough. In more detail, the LCD can include an array of addressable pixels or regions of a substrate that have an adjustable opacity, as described further herein.

Figure 4:
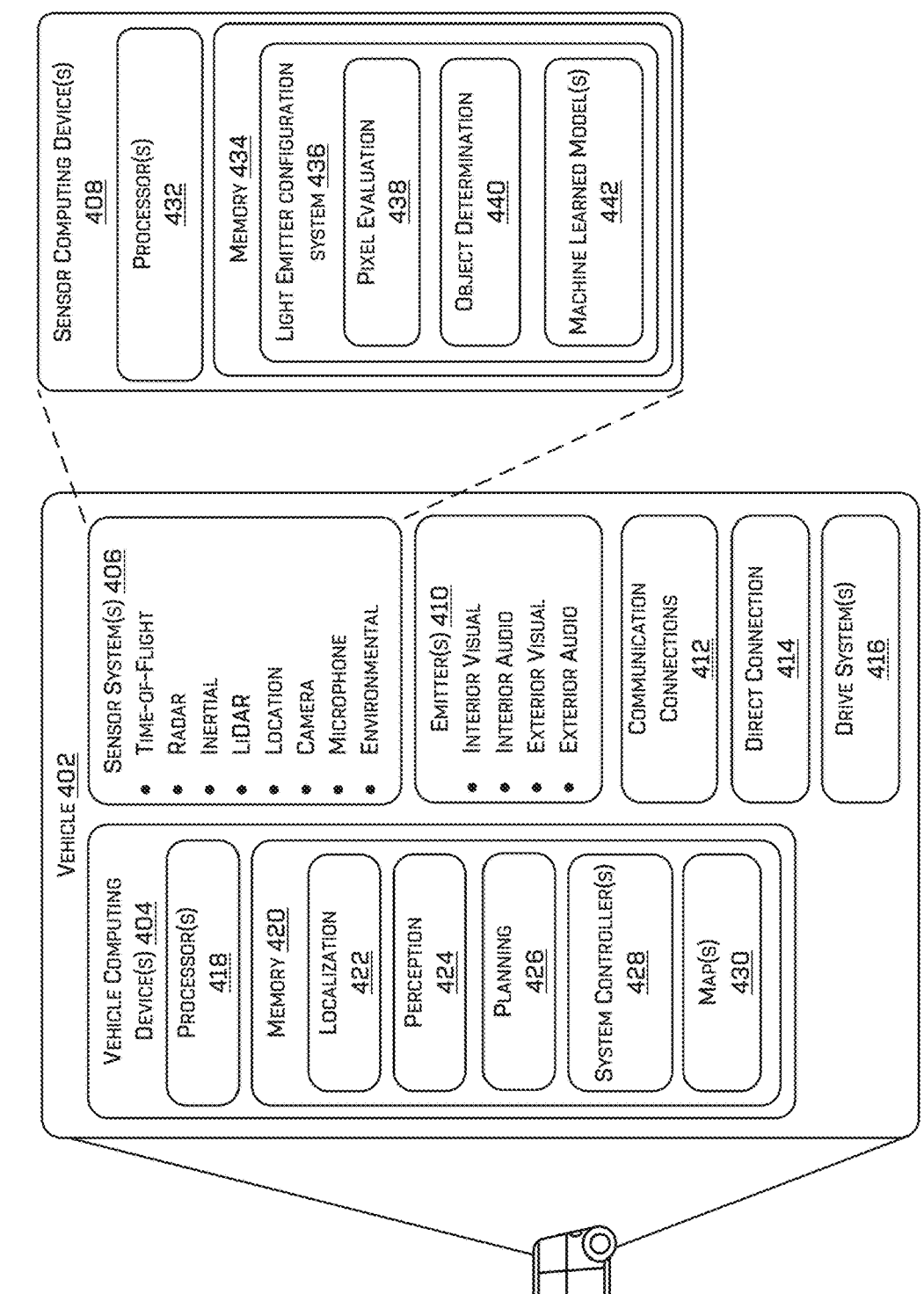
FIG. 4 depicts a block diagram of an example system for implementing the techniques described herein.

FIG. 4 depicts a block diagram of an example system 400 for implementing the techniques discussed herein. In at least one example, the system 400 can include a vehicle 402, which can be similar to (or the same as) the vehicle 102 described above with reference to FIG. 1. In the illustrated system 400, the vehicle 402 is an autonomous vehicle; however, the vehicle 402 can be any other type of vehicle. Moreover, although implementations of this disclosure are discussed in the context of vehicles, techniques described herein may be applicable to other sensor use cases, including those not associated with vehicles.

The vehicle 402 can include one or more vehicle computing devices 404, one or more sensor systems 406, which may include one or more sensor computing devices 408, one or more emitter(s) 410, one or more communication connections 412, at least one direct connection 414 (e.g., for physically coupling with the vehicle 402 to exchange data and/or to provide power), and one or more drive system(s) 416. In some instances, the vehicle 402 can include more or fewer instances of the vehicle computing device(s) 404. The sensor system(s) 406 can be configured to capture sensor data associated with an environment. In examples, the sensor system(s) 406 can include the sensor system(s) 104.

The vehicle computing device(s) 404 can include one or more processors 418 and memory 420 communicatively coupled with the one or more processors 418. In at least one instance, the processor(s) 418 can be similar to the processor(s) 106 and the memory 420 can be similar to the memory 108 described above with reference to FIG. 1. In the illustrated example, the memory 420 of the vehicle computing device(s) 404 stores a localization component 422, a perception component 424, a planning component 426, one or more system controllers 428, and one or more maps 430. Though depicted as residing in the memory 420 for illustrative purposes, it is contemplated that the localization component 422, the perception component 424, the planning component 426, the system controller(s) 428, and/or the map(s) 430 can additionally, or alternatively, be accessible to the vehicle computing device(s) 404 (e.g., stored in a different component of vehicle 402 and/or stored remotely).

In at least one example, the localization component 422 can include functionality to receive data from the sensor system(s) 406 to determine a position of the vehicle 402. In instances described herein, in which the sensor system(s) 406 include a time-of-flight sensor, the localization component 422 can receive data generated upon configuration of the light emitter(s). In other implementations, the localization component 422 can include and/or request/receive a three-dimensional map, e.g., of the map(s) 430, of an environment and can continuously determine a location of the autonomous vehicle within the map. In some instances, the localization component 422 can use SLAM (simultaneous localization and mapping) or CLAMS (calibration, localization and mapping, simultaneously) to receive image data, such as from the time-of-flight sensor, lidar data, RADAR data, SONAR data, IMU data, GPS data, wheel encoder data, or any combination thereof, and the like to accurately determine a location of the autonomous vehicle 402. In some instances, the localization component 422 can provide data to various components of the vehicle 402 to determine an initial position of an autonomous vehicle for generating a candidate trajectory, as discussed herein. The localization component 422 may also determine, e.g., from the map(s) 430, a location of objects known to be in the environment, such as road signs, traffic lights, pedestrians, etc.

In some examples, the perception component 424 can include functionality to perform object detection, segmentation, and/or classification. In some instances, the perception component 424 can receive data, which may include time-of-flight sensor data, and generate processed sensor data that indicates a presence of an object in the environment of, e.g., proximate, the vehicle 402 and/or a classification of the object as an object type (e.g., highly-reflective object, car, pedestrian, cyclist, building, tree, road surface, curb, sidewalk, unknown, etc.). In additional and/or alternative examples, the perception component 424 can provide processed sensor data that indicates one or more characteristics associated with a detected object and/or the environment in which the object is positioned. In some examples, characteristics associated with an object can include, but are not limited to, an x-position (global position), a y-position (global position), a z-position (global position), an orientation, an object type (e.g., a classification), a velocity of the object, an extent of the object (size), or the like. Characteristics associated with the environment can include, but are not limited to, a presence of another object in the environment, a state of another object in the environment, a time of day, a day of a week, a season, a weather condition, an indication of darkness/light, etc. In the context of examples described herein, the perception component 424 can perform some or all of the functionality ascribed to the object location determination component 124, such as determining the presence and location of objects in the environment.

In some instances, the planning component 426 can determine a path for the vehicle 402 to follow to traverse through an environment. For example, the planning component 426 can determine various routes and trajectories and various levels of detail. In some examples, the planning component 426 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 426 can generate an instruction for guiding the autonomous vehicle along at least a portion of the route from the first location to the second location. In at least one example, the planning component 426 can determine how to guide the autonomous vehicle from a first waypoint in the sequence of waypoints to a second waypoint in the sequence of waypoints. In some examples, the instruction can be a trajectory, or a portion of a trajectory. In some instances, multiple trajectories can be substantially simultaneously generated (i.e., within technical tolerances) in accordance with a receding horizon technique. A single trajectory of the multiple trajectories in a receding horizon having the highest confidence level may be selected to operate the vehicle.

In other examples, the planning component 426 can alternatively, or additionally, use data from the perception component 424 to determine a path for the vehicle 402 to follow to traverse through an environment. For example, the planning component 426 can receive data from the perception component 424 regarding objects associated with an environment. Using this data, the planning component 426 can determine a route to travel from a first location (e.g., a current location) to a second location (e.g., a target location) to avoid objects in an environment.

As noted above, the vehicle computing device(s) 404 can include the system controller(s) 428, which can be configured to control steering, propulsion, braking, safety systems, emitters, communication systems, and/or other systems of the vehicle 402. The system controller(s) 428 can communicate with and/or control corresponding systems of the drive system(s) 416 and/or other components of the vehicle 402, which may be configured to operate in accordance with a trajectory provided from the planning component 426.

In some examples, the map(s) 430 can be stored on a remote computing device. In some examples, multiple maps 430 can be stored based on, for example, a characteristic (e.g., type of entity, time of day, day of week, season of the year, etc.). Storing multiple maps 430 can have similar memory requirements but increase the speed at which data in a map can be accessed. As noted above, the map(s) 430 may be accessed to identify the presence and location of objects, such as street signs (or other reflective objects), in an environment of the vehicle 402. In some examples, the light emitter configuration system 436 can use map(s) 430 at least in part to determine regions of interest in the environment that may correspond to reflective objects (e.g., in the absence of receiving information about unreliable or saturated pixels).

In at least one example, the sensor system(s) 406 can be similar to the sensor system(s) 104 described above with reference to FIG. 1. For instance, and although not illustrated in FIG. 4, the sensor system(s) 406 can include an emitter system like one or more of the emitter systems 110 and 300 described herein. The sensor system(s) 406 may include sensors, such as the lidar sensor 130, image sensor 138, location sensors (e.g., GPS, compass, etc.), inertial sensors (e.g., inertial measurement units (IMUs), accelerometers, magnetometers, gyroscopes, etc.), RADAR sensors, SONAR sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 406 can include multiple instances of each of these or other types of sensors. For instance, the camera sensors can include multiple cameras and/or lidar sensors disposed at various locations about the exterior and/or interior of the vehicle 402 (e.g., the corners, front, back, sides, and/or top of the vehicle 402). The sensor system(s) 406 can provide input to the vehicle computing device(s) 404.

The sensor system(s) 406 can include the sensor computing device(s) 408, which can include one or more processors 432 and memory 434 communicatively coupled with the one or more processors 432. The one or more processors 432 can be similar to the processor(s) 106 and/or to the processor(s) 418, described above. The memory 434 can be similar to the memory 108 and/or to the memory 420, described above. In the illustrated example, the memory 434 of the sensor computing device(s) 408 can store a light emitter configuration system 436 (also referred to as a sensor control system 436), which can include a pixel evaluation component 438, an object determination component 440, and a machine learned model(s) component 442. Though depicted as residing in the memory 434 for illustrative purposes, it is contemplated that the sensor control system 436 (as well as its associated components) can additionally, or alternatively, be accessible to the sensor system(s) 406 (e.g., stored in a different component of vehicle 402 and/or stored remotely). Moreover, although the sensor control system 436 (as well as its associated components) is illustrated as being stored in and/or part of the sensor computing device(s) 408, in other implementations any or all of these components may be stored in the memory 420 and/or in some other, not illustrated memory, such as a remote memory associated with a remote computing device. That is, although FIG. 4 illustrates several components as being part of the sensor computing device(s) 408 of the sensor system(s) 406, the processing associated with any or all of those components may be performed other than at the sensor. In one example, the sensor system(s) 406 may output raw data (e.g., the quadrature data discussed above) for processing in accordance with functionality ascribed herein to one or more of the pixel evaluation component 438, the object determination component 440, and/or machine learned model(s) component 442, but that processing may be performed other than at the location of the emitter and the receiver. Without limitation, the sensor system(s) 406 can include on-board processing capabilities to perform any or all functionality described herein and associated with dynamic control of an emitting system, e.g., to reduce the impacts of glare on the sensor system(s) 406. Alternatively, processing of the sensor data may be carried out other than at the sensor system(s) 406.

The sensor computing device(s) 408, including the sensor control system 436, may be configured to generate and/or process data in many formats. For example, and as noted above, the sensor computing device(s) 408 can measure a phase shift between the carrier and the response carrier and/or perform numerical integration calculations to determine the sensor data in the quadrature format. In other examples, the sensor computing device(s) 408 can determine an intensity and depth format of the sensor data (e.g., generate the depth and intensity images). For purposes of illustration only, the sensor system(s) 406 can determine the sensor data in the intensity and depth format where an individual pixel in the sensor data is associated with an 8-bit value for the intensity and a 12-bit value for the depth.

The pixel evaluation component 438 can be configured to receive sensor data generated by the sensor system(s) 406, e.g., by a time-of-flight senor, and determine regions of interest. In examples, determining such regions may include identifying saturated pixels, underexposed pixels, or pixels that are otherwise unreliable. For instance, highly-reflective objects may result in pixel saturation and/or otherwise unreliable sensor data at pixels associated with a location of such objects. The pixel evaluation component 438 may be the pixel evaluation component 122, described further herein.

The object determination component 440 can include functionality to identify objects. In some instances, the objects may correspond to an identified region of interest. In some examples, reflected light from the object captured by the receiver may result in unreliable pixels and/or the location of such objects. For example, the object determination component 440 can determine the presence of a highly-reflective or glare-inducing object from information received from the pixel evaluation component 438. In at least one example, the presence and/or location of an object can be based on a presence of one or more saturated and/or unreliable pixels. The object determination component 440 may be the object location determination component 124. In at least some instances, functionality of the object determination component 440 can be carried out, at least in part, by the perception component 424, as described herein.

The machine learned model(s) component 442 may be the machine learned model(s) component 126 and can include functionality to generate control signals such as the configuration signals 128 and configuration signal(s) 310. In some examples, the machine learned model(s) component 442 can receive information from the pixel evaluation component 438 and/or from the object determination component 440 to determine regions in a field of view of the sensor for which illumination intensity should be altered (e.g., regions of interest). In at least some examples, the sensor configuration determination component 442 can determine to increase or reduce illumination proximate regions that corresponding to the region of interest.

In some instances, the machine learned model(s) component 442 can include any models, algorithms, and/or machine learning algorithms, as discussed herein.

The emitter(s) 410 are configured for emitting light and/or sound, as described above. In the illustrated example, the emitter(s) 410 can include interior visual and/or interior audio emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 410 in this example also include exterior emitters, which may be exterior visual and/or exterior audio emitters. By way of example and not limitation, the exterior emitters in this example can include lights to signal a direction of travel or other indicator of vehicle action (e.g., indicator lights, signs, light arrays, etc.) and one or more audio emitters (e.g., speakers, speaker arrays, horns, etc.) to audibly communicate with pedestrians or other nearby vehicles, one or more of which may comprise acoustic beam steering technology.

The communication connection(s) 412 enable communication between the vehicle 402 and one or more other local or remote computing device(s), including the sensor computing device(s) 408. For instance, the communication connection(s) 412 can facilitate communication with other local computing device(s) on the vehicle 402 and/or the drive system(s) 416. Also, the communication connection(s) 412 can allow the vehicle to communicate with other nearby computing device(s) (e.g., other nearby vehicles, traffic signals, etc.). The communications connection(s) 412 can also enable the vehicle 402 to communicate with a remote teleoperations computing device or other remote services.

The communications connection(s) 412 can include physical and/or logical interfaces for connecting the vehicle computing device(s) 404 to another computing device or an external network (e.g., the Internet). For example, the communications connection(s) 412 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In some examples, the drive system(s) 416 can include a single drive system 416. In other examples, the vehicle 402 can have multiple drive systems, and individual drive systems 416 can be positioned on opposite ends of the vehicle 402 (e.g., the front and the rear, etc.). In at least one example, the drive systems(s) 416 can include one or more sensor systems to detect conditions of the drive system(s) 416 and/or the surroundings of the vehicle 402. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive systems, lidar sensors, RADAR sensors, etc. Some sensors, such as the wheel encoders can be unique to the drive system(s) 416. In some cases, the sensor system(s) on the drive system(s) 416 can overlap or supplement corresponding systems of the vehicle 402 (e.g., the sensor system(s) 406).

The drive system(s) 416 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 416 can include a drive system controller which can receive and preprocess data from the sensor system(s) and to control operation of the various vehicle systems. In some examples, the drive system controller can include one or more processors and memory communicatively coupled with the one or more processors. The memory can store one or more modules to perform various functionalities of the drive system(s) 416. Furthermore, the drive system(s) 416 also include one or more communication connection(s) that enable communication by the respective drive system with one or more other local or remote computing device(s).

The processor(s) 418 of the vehicle 402, the processor(s) 432 of the sensor computing device(s) 408, and/or the processor(s) 106 of the sensor system(s) 104 can be any suitable processor capable of executing instructions to process data and perform operations as described herein. By way of example and not limitation, the processor(s) 418, 432, 106 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 420, 434, 108 are examples of non-transitory computer-readable media. The memory 420 and 108 can store an operating system and one or more software applications, instructions, programs, and/or data to implement the methods described herein and the functions attributed to the various systems. In various implementations, the memory 420, 434, 108 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

Figure 5:
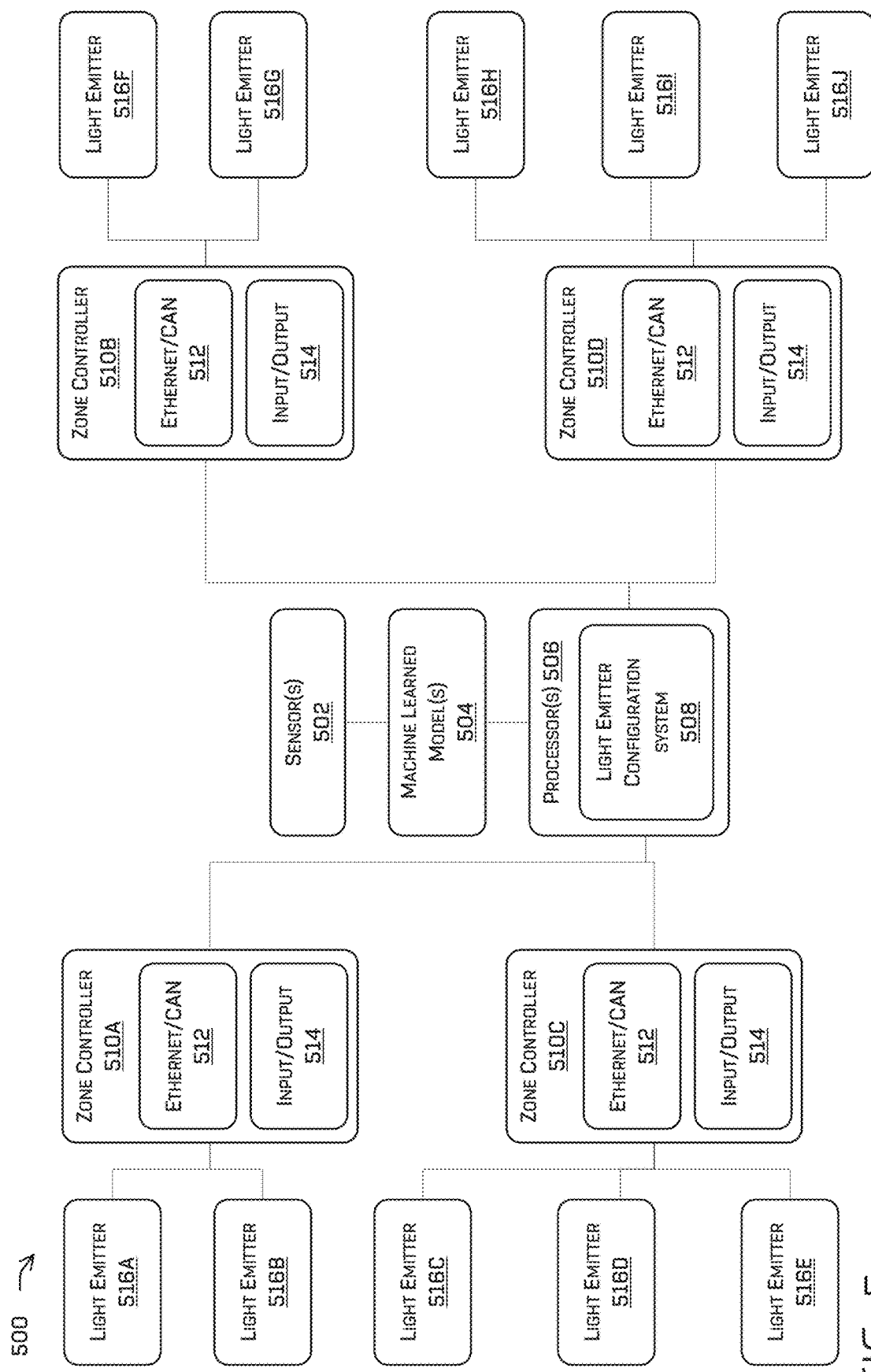
FIG. 5 illustrates a block diagram of an example system including zone controllers for controlling light emitters, as described herein.

FIG. 5 illustrates a block diagram of an example system 500 including zone controllers for controlling light emitters, as described herein. The example system 500 may be associated with an autonomous vehicle. The example system 500 can include sensor(s) 502, machine learned model(s) 504, processor(s) 506, zone controller(s) (e.g., first zone controller 510A, second zone controller 510B, third zone controller 510C, fourth zone controller 510D), and light emitters (e.g., light emitters 516A, 516B, 516C, 516D, 516E, 516F, 516G, 516H, 516I, 516J, etc.). The light emitters may the same or different types of light emitters (e.g., headlights, turn signal lights, displays, etc.).

Sensor(s) 502 can include lidar sensors, radar sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The system 500 can include multiple instances of each of these or other types of sensors.

In some examples, machine learned model(s) 504 may same or similar to machine learned model(s) component 126. The processor(s) 506 may be same or similar to processor(s) 106 described in FIG. 1. The processor(s) 506 can include an emitter configuration system 508, which can be same or similar to emitter configuration system 120. The emitter configuration system 508 is configured to determine configuration signals based at least in part on sensor data, environmental data, etc. as discussed herein. The configuration signals may be sent to one or more of a first zone controller 510A, second zone controller 510B, third zone controller 510C, and/or fourth zone controller 510D. Though four zone controllers are illustrated in FIG. 5 fewer or more zone controllers may be used.

A zone controller (e.g., first zone controller 510A) may be a component of a vehicle that is responsible for managing and coordinating the functions of one or more lights emitters (e.g., first light emitter 516A, second light emitter 516B, etc.). A zone controller may enable the localized control of electronic devices associated with light emitters, streamlines communication, and reduces the need for complex wiring across the entire vehicle. A zone controller may control a single light emitter or multiple light emitters. For example, first zone controller 510A may be configured to control a first headlight, turn signals, front-facing sensors, etc. located at one end of the vehicle. In some examples, in the case of a vehicle that is bidirectional, a zone controller may be configured to receive signals indicating that one end of the vehicle is a leading end or a trailing end. The zone controller may be configured to switch between a first state associated with a first end of the vehicle being a leading end and a second state associated with the first end transitioning to a trailing end.

A zone controller may include an ethernet/Controller Area Network (CAN) component 512 and input/output component 514. The ethernet/CAN component 512 may be a vehicle bus standard designed to enable efficient communication between electronic control units. The ethernet/CAN component 512 may include a cyclic redundancy code (CRC) to identify potential errors (e.g., if an error is detected in a signal, the network can request the signal or message be retransmitted, ensuring data integrity). The input/output component 514 can manage exchange of data, commands, signals, etc. between the zone controller and peripheral devices. Example input devices may include the various sensor(s) described throughout the application and/or ambient light sensors that detect the level of ambient light outside the vehicle to automatically switch the headlights on or off, steering angle sensor(s) that provide data enabling an adaptive headlight to pivot in the direction of a turn to improve visibility around corners, camera sensor(s) that provide data enabling detection of oncoming vehicles and other objects on the road, etc. Example output devices may include light emitter units such as LED headlights, adaptive high-beam systems (e.g., a headlight that switches between high and low beams or adjusts the high beam pattern to avoid blinding oncoming traffic), laser headlights, etc.), headlight actuators configured to control a pivoting of a headlight to correspond to a direction of the steering, signal lights (e.g., turn signals), fog lights, and the like.

Figure 6:
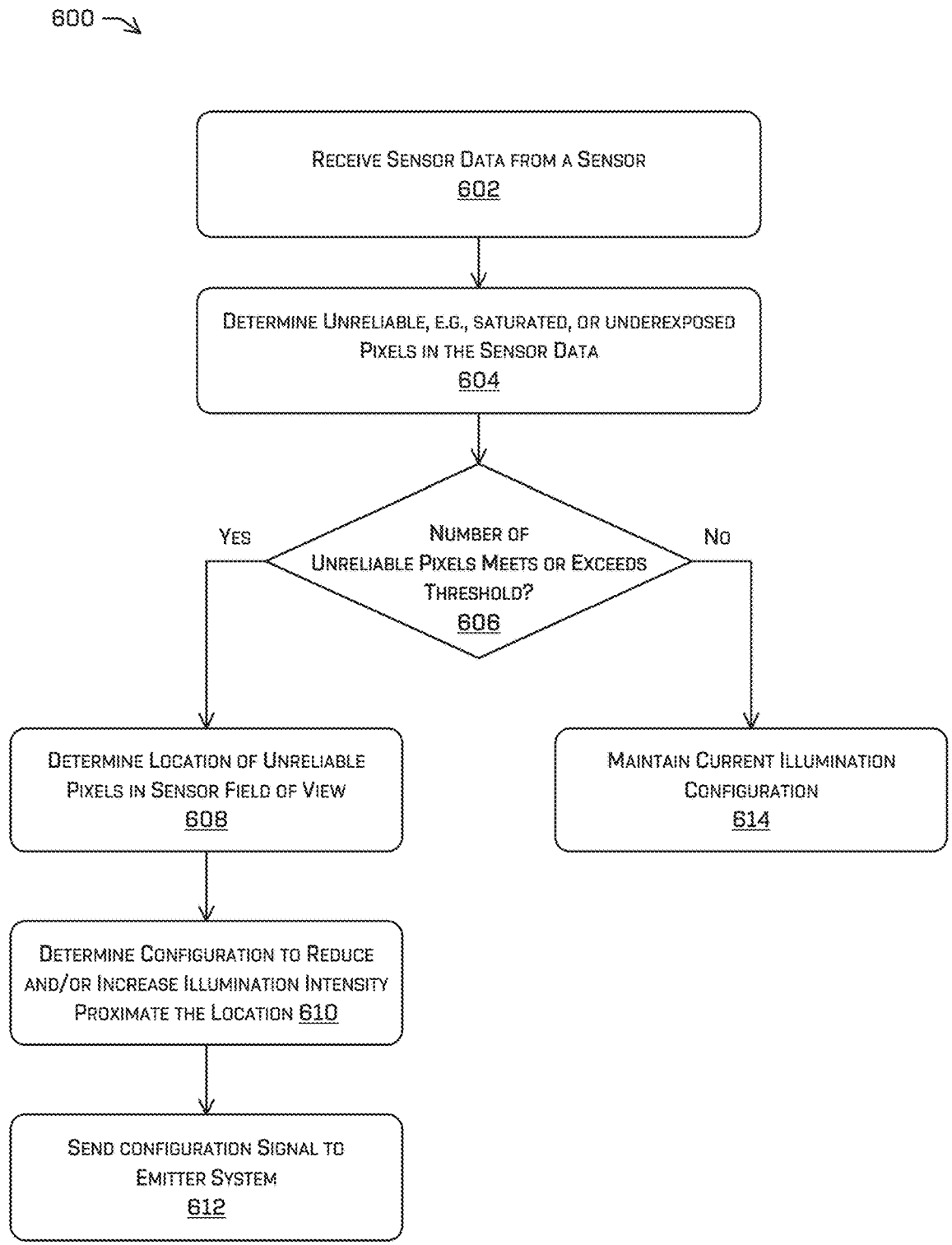
FIG. 6 is a flowchart illustrating an example process for determining unreliable pixels, determining a location of the unreliable pixels, determining a configuration of individual elements of an array of light emitters, and sending a configuration signal to an emitter system, as described herein.
Figure 7:
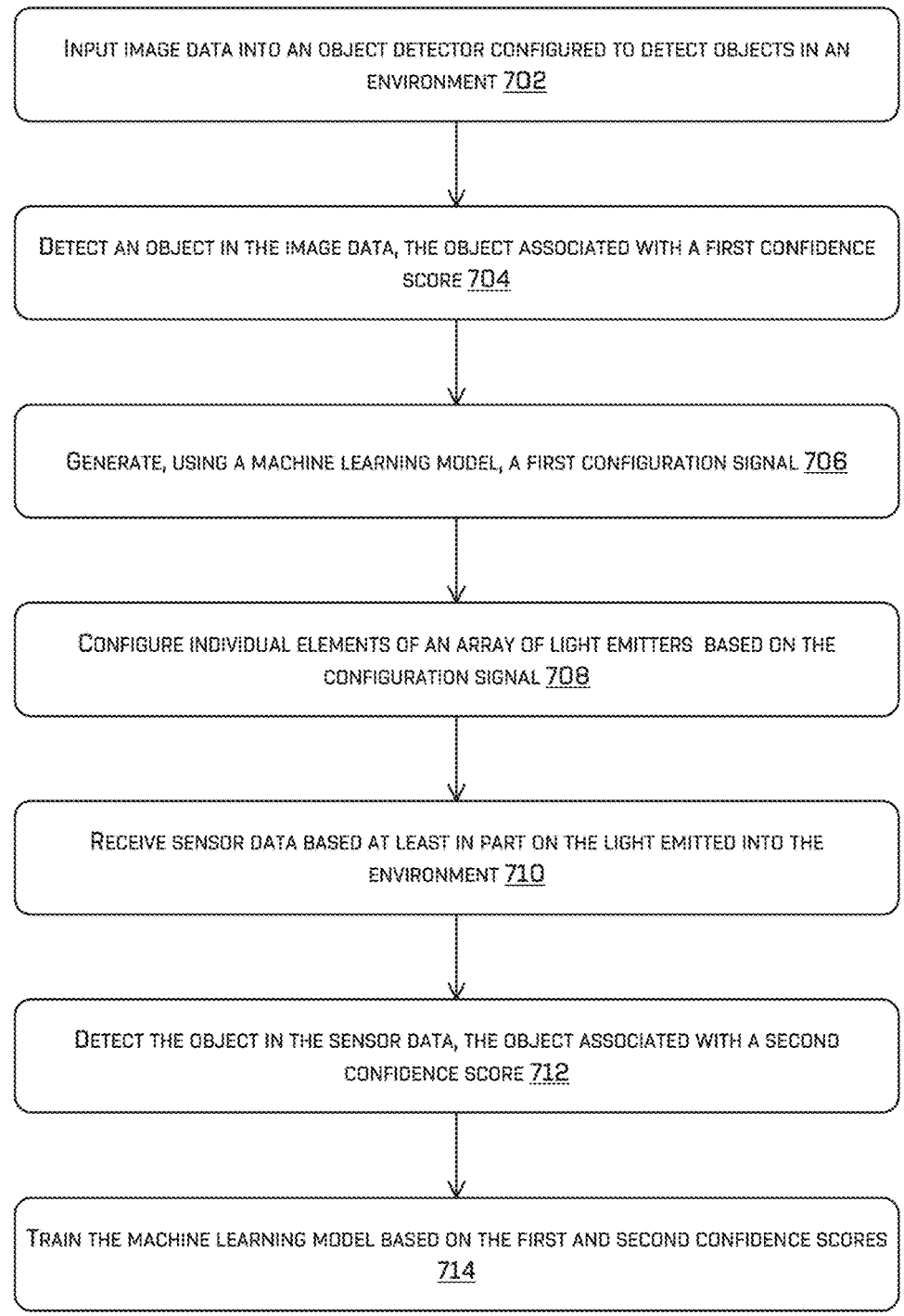
FIG. 7 is a flowchart illustrating an example method for training a machine learning model configured to generate configuration signals, as described herein.

FIGS. 6 and 7 (and portions of FIGS. 2A and 2B, discussed above) illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

In more detail, FIG. 6 is a flowchart illustrating an example process for determining unreliable pixels, determining a location of the unreliable pixels, determining a configuration of individual elements of an array of light emitters, and sending a configuration signal to an emitter system, as described herein. For example, some or all of the process 600 can be performed by the sensor system(s) 104 and/or by one or more components illustrated in FIG. 4, as described herein. For example, some of all of the process 600 can be performed by the sensor computing device(s) 408 of the sensor computing device 408, including but not limited to the pixel evaluation component 438, the object determination component 440, and/or the machine learned model(s) component 442. However, the process 600 is not limited to being performed by these components, and the components are not limited to performing the process 600.

At operation 602, the process 600 includes receiving sensor data from a sensor. For example, techniques described herein may be useful for adjusting illumination intensity of individual light emitters of an emitter system (e.g., a headlight) based at least in part on sensor data received therefrom. The operation 602 may include receiving lidar data and/or image sensor data including intensity and/or depth information. The received sensor data may be generated based in part on the emitter system being in a first configuration. In at least some examples, the emitter system may be configured to provide a generally uniform illumination in a field of view of the sensor(s).

At operation 604, the process 600 can include determining unreliable pixels in the sensor data. In some examples, the unreliable pixels in the sensor data can be saturated pixels (e.g., overexposed pixels) or underexposed pixels. For instance, the pixel evaluation component 122 or the pixel evaluation component 438 can determine that pixels having an intensity value equal to or above a threshold intensity are unreliable. In other instances, unreliable pixels may be determined using other techniques described herein or incorporated by reference herein. For instance, unreliable pixels may be determined from an analysis of phase value information associated with the sensor data. In at least some examples, unreliable pixels may be the result of glare caused by one or more objects in the field of view that are highly-reflective (e.g., because of their surface composition and/or their close proximity to the sensor). In other examples, the unreliable pixels may be caused by environmental factors such as insufficient lighting. For instance, when the vehicle is traversing an environment during evening hours or when the vehicle drives through a tunnel, lower ambient light levels can lead to underexposure of pixels. Rainy conditions can also cause a reduction in visibility and contrast and reduce a level of detail that is captured by sensor(s) (e.g., details of an object may be hard to distinguish and it may be more difficult to identify the edge of an object, etc.).

At operation 606, the process 600 can include determining whether a number of unreliable pixels meets or exceeds a threshold. For example, the operation 606 can include determining whether a number of unreliable pixels in a region or portion of the sensor data meets or exceeds a threshold number of unreliable pixels. As detailed herein, the number of unreliable pixels may be determined for each area corresponding to a segment of the field of view for which illumination intensity can be independently altered. In examples, the threshold referred to in the operation 606 may be a threshold number of pixels, a threshold ratio, e.g., of unreliable pixels to reliable pixels or to total pixels, or some other metric. In implementations, the threshold may be based on heuristics, and may generally be established as lower boundary associated with reliable sensor data. Accordingly, as the unreliable pixels are determined to meet or exceed the threshold, the data associated with the respective section or region may be deemed unreliable. In some examples, the threshold may be based at least in part on environment conditions or the region of interest. For instance, a first threshold may be used when an identified region of interest is associated with saturated pixels (e.g., due to highly reflective object) and a second threshold may be used when an identified region of interest is associated with underexposed pixels (e.g., poorly lit object in a tunnel the vehicle is driving through). In some examples, the process 600 may include determining a confidence score associated with unreliable pixels.

If, at the operation 606, it is determined that the number of unreliable pixels does meet or exceed the threshold, at operation 608, the process 600 can include determining a location of the unreliable pixels in a sensor field of view (or determining a region of interest). For example, unreliable pixels can identify a location of an object. The location of the unreliable pixels may be determined as one or more regions or portions of the field of view corresponding to region(s) or portion(s) for which the illumination intensity can be altered. In some examples, the operation 606 can determine multiple locations of unreliable pixels associated with a single object. For example, the operation 606 may determine a first location of the unreliable pixels associated with the object itself and a second location of unreliable pixels proximate the object (e.g., surrounding the object or a perimeter of the object and/or adjacent areas of the object in some instances).

At an operation 610, the process 600 can also include determining a configuration to change an illumination intensity proximate the location. For example, in the context of FIG. 3, the operation 610 can include determining which individual light emitters 304 illuminate the object and/or areas proximate the object. The operation 610 can also include generating a configuration signal to implement the new configuration.

At operation 612, the process 600 can also include sending a configuration signal to an emitter system for implementation. For example, the configuration signal may be a signal to a zone controller of a headlight of a vehicle. Upon receipt of the signal, an emitter array of the headlight may be reconfigured in order to implement the desired change (e.g., by increasing or reducing an illumination intensity at one or more portions of the field of view corresponding to the region of interest). Once implemented at the headlight, subsequent image data can be captured with the advantage of an altered illumination in the environment (e.g., increased illumination in order to better detect an object and decreased illumination in order to reduce the deleterious effects of glare associated with a highly reflective surface).

If, at the operation 606, it is determined that the number of unreliable pixels does not meet or exceed the threshold, at operation 614 the process 600 can include maintaining the current illumination configuration of the emitter system. In some examples, the emitter system may be associated with a default configuration. For example, the default configuration may cause default number (e.g., 75%) of the total number of light emitters to emit light into the environment. In some examples, the default configuration may cause one or more light emitters to emit light at a default or a predetermined illumination intensity.

Modifications to the process 600 also are contemplated. By way of non-limiting example, in some instances, the emitter system may be reconfigured in the absence of determining that pixels are unreliable. For instance, the emitter system may be reconfigured based at least in part on map data. That is, historical map data may indicate a location of a street sign. In this example, a reconfiguration signal can be generated by a machine learning model(s) in contemplation (i.e., prior to the vehicle receiving sensor data associated with the street sign or otherwise unreliable sensor data). That is, the emitter system can be reconfigured prior to receiving an indication of saturated pixels, unreliable pixels, etc. associated with reflective objects such as street signs.

In some examples, an operation similar to the operation 608 may include determining information about an object in the field of view or soon to be in the field of view. The information may include a type of the object, a location of the object, and/or a predicted trajectory of the object, for example. For instance, the location and/or type of the object may be known from map data, sensor data from different modalities, or the like. When the object is known to be a highly-reflective object or is relatively close to the sensor, the process 600 may proceed to the operation 610. Stated differently, in some implementations the emitter system can be reconfigured in anticipation or expectation of glare, despite that the glare may not yet be saturating pixels.

FIG. 7 illustrates an example process 700 for training a machine learning model configured to generate configuration signals. For example, some or all of the process 700 can be performed by the machine learned model(s) component 126 illustrated in FIGS. 1, 2A, and 2B, as described herein. However, the process 700 is not limited to being performed by the machine learned model(s) component 126, and the machine learned model(s) component 126 is not limited to performing the process 700. In some examples, one or more of the following operations may be performed by a remote computing system. In some examples, a simulation system can be utilized to perform one or more of the operations below.

At operation 702, the process 700 includes inputting image data into an object detector configured to detect objects in an environment. In some examples, different or additional sensor data may be input into the object detector. For example, lidar sensor data may additionally or alternatively be input into the object detector. In some examples, the sensor data may be real-world sensor data generated by a vehicle operating in the real-world environment. The sensor data may additionally or alternatively be generated by a simulation system. The simulation system may include one or more computing devices configured to execute a simulation scenario used to train a machine learning model and/or test an emitter configuration system of a vehicle (e.g., emitter configuration system 120). In some examples, the image data may depict a road scene from a point-of-view of a vehicle traversing the roadway in the scene. The image may be captured by a camera mounted on a vehicle, or may be partially or completely synthetic (e.g., generated by a model, simulation system, etc.).

In some examples, the image data can be associated with a training configuration signal that indicates a configuration state of an emitter system (e.g., a light emitter array) when capturing the image data. For example, the training configuration signal may cause the emitter system to selectively increase and/or decrease individual light emitters. That is, the training configuration signal can define a level of intensity for individual light emitters of the emitter system. In some examples, the training configuration signal may define one or more zones (or portions) of light emitters to adjust (e.g., adjust a first zone, column, row, portion, etc. of light emitters according to a first illumination intensity and a second zone, column, row, portion, etc. of light emitters to a second illumination intensity). In some examples, the training configuration signal may direct (or control) the emitter system to not change (or maintain) the illumination intensity of a portion of light emitters (e.g., one or more light emitters) such that the illumination intensity of the portion of light emitters is maintained (e.g., for a period of time). In some examples, the training configuration signal can cause the emitter system to change a color or pattern (e.g., present a symbol, warning, word(s), etc.) of the one or more light emitters.

At operation 704, the process 700 includes detecting an object in sensor data. The sensor data may include image data, lidar data, etc. The object may be associated with a first confidence score indicating an accuracy or certainty of a detection of the object in the environment. For example, the confidence score may be a numeric value between 0 and 1 (or a percentage) indicating how confident an object detection algorithm is that a particular object is present in the environment and/or what type of object it is, etc. The confidence score may be a measure of certainty that the detected object in the image (or video frame) belongs to a predicted classification (e.g., static object, dynamic object, pedestrian, bicyclist, dog, reflective object, non-reflective object, etc.). The object detector may additionally predict an object track or trajectory.

At operation 706, the process 700 includes generating a first configuration signal using a machine learning model. That is, the machine learned model may be configured to receive sensor data, environmental data, and/or other data from the object detector and generate a configuration signal that can control aspects of an emitter system 110. More specifically, the configuration signal can cause one or more microcontrollers of an emitter system (e.g., a vehicle headlight) to increase or decrease an illumination intensity of individual light emitting elements.

In some examples, the machine learned model can output a first configuration signal for a first emitter system (e.g., a first headlight) and a second configuration signal for a second emitter system (e.g., a second headlight proximate the first headlight) based in part on the sensor data. The first and second configuration signals may or may not be the same. For instance, an object may be detected on one side of a vehicle (e.g., far left side) and the illumination pattern for the left headlight may be altered (e.g., to increase or decrease an illumination intensity of a region at or proximate the object) while the illumination pattern for the right headlight may not be altered or may be altered differently than the left headlight (e.g., the illumination pattern may be minimally altered due to the object being located on the far side of the vehicle).

At operation 708, the process 700 includes configuring individual light emitters of an array of light emitters associated with the emitter system based at least in part on the configuration signal. For example, as discussed above in relation to FIG. 3, microcontroller(s) may be configured to signal the light emitters to emit light at a particular illumination intensity. In some examples, the microcontrollers may control the light emitters in a binary manner (e.g., such that the light emitters are either on or off). In other instances, the microcontrollers can increase or decrease the amount of light emitted by the light emitters within a range (e.g., by altering an applied voltage or current). The reconfigured emitter system (or array of light emitters) may emit light into the environment.

At operation 710, the process 700 includes receiving sensor data based at least in part on the light emitted into the environment by the emitter system. For example, additional image data and/or lidar data may be received following the reconfiguration of the emitter system.

At operation 712, the process 700 includes detecting the object in the sensor data. The object may be associated with a second confidence score indicating a second accuracy or certainty of a detection of the object in the environment. The second confidence score may be a second numerical value between 0 and 1 (or percentage). That is, altering the illumination pattern of emitted light at one or more regions of interest (e.g., corresponding to an object in the environment) may increase or decrease the accuracy of a detected object in the environment. In some examples, the machine learning model may output a binary determination (e.g., "yes" or "no") on whether an object was better detected or classified, along with a confidence score of the binary determination. In some examples, if the second confidence score is lower than the first confidence score, the process 700 may include generating a second configuration signal, reconfiguring the emitter system, capturing additional sensor data, detecting the object in the additional sensor data and associating the object with a third confidence score indicating a third accuracy or certainty of a detection of the object.

At operation 714, the process 700 includes training the machine learning model based at least in part on the first and second confidence scores. That is, the first and second confidence scores may indicate how, if at all, the configuration signal generated by the machine learned model impacted the detection and/or identification of the object. For example, in the case of a reflective object such as a stop sign, a configuration signal that caused a portion of the emitter system to decrease the illumination intensity of light emitted toward the stop sign and improved detection of the stop sign (e.g., improve the detection of the word "stop") may be associated with a higher confidence score. In some examples, the process may include determining a loss based on the first and second confidence scores and training the machine learned model based on the loss. In some examples, the process 700 may include generating additional sensor data (e.g., generating additional image data in a simulation system) that alters the illumination pattern and/or intensity of individual light emitters of an emitter system in response to changes in the environment, objects, etc. in order to provide additional training data.

In some examples, the process may include determining a cost (or weight) of decisions or actions according to the confidence score that an object detection algorithm has in its predictions. The cost may be associated with false positives (e.g., cost of incorrectly detecting an object that is not present), false negatives (e.g., cost of failing to detect an object that is present), and the like.

In some examples, individual machine learned models may be trained to output configuration signals particular to an environmental condition or trigger. For example, a first machine learning model may be trained to generate configuration signals for improved detection of objects in a low-lit environment, a second machine learning model may be trained to generate configuration signals for improved identification of words or symbols on reflective signs (e.g., license plates, street signs or traffic signs, billboards, parking signs, highway markers, barrier and guardrail reflectors, emergency vehicle decals, etc.), a third machine learning model may be trained to generate configuration signals for improved detection of objects in a particular weather or environmental condition (e.g., rainy or snowy conditions), etc. In some examples, individual machine learning models may be trained to output configuration signals particular to a type of data or modality (e.g., image data, lidar data, thermal data, audio data, etc.).

Example Clauses

A: A system comprising: a light source comprising an array of light emitters configured to controllably emit light into an environment; one or more sensors; one or more processors; and one or more non-transitory computer-readable media storing computer-executable instructions that, when executed by the one or more processors, configure the system to perform operations comprising: receiving first sensor data from the one or more sensors; determining, based at least in part on the first sensor data, a region of interest in the environment; based at least in part on the region of interest, inputting the first sensor data into a machine learned model; receiving, as output from the machine learned model, a configuration signal; controlling individual elements of the array of light emitters of the light source to emit light into the environment based at least in part on the configuration signal; capturing second sensor data based at least in part on the light emitted into the environment; and controlling a vehicle based at least in part on the second sensor data.

B. The system of paragraph A, wherein the configuration signal causes a first portion of elements to emit light at a first illumination intensity and causes a second portion of elements different than the first portion to emit light at a second illumination intensity, wherein the first illumination intensity is higher than the second illumination intensity.

C. The system of paragraphs A or B, wherein: the one or more sensors comprise a lidar sensor and an image sensor, the first sensor data comprises lidar data received from the lidar sensor at a first time, and the second sensor data comprises image data received from the image sensor at a second time after the first time.

D. The system of any of paragraphs A-C, wherein the machine learned model is trained based at least in part on: inputting image data into an object detector configured to detect objects, the image data associated with a training configuration signal; detecting an object in the image data, the object associated with a confidence score; determining a loss based on the confidence score; and training the machine learned model based on the loss.

E. The system of any of paragraphs A-D, the operations further comprising: inputting one or more of environmental data, map data, or time data into the machine learned model, wherein the configuration signal is based at least in part on the one or more of the environmental data, the map data, or the time data.

F. A method comprising: receiving first sensor data from a first sensor associated with a vehicle traversing an environment; determining, based at least in part on the first sensor data, a region of interest in the environment; based at least in part on the region of interest, inputting the first sensor data into a machine learned model; receiving, as output from the machine learned model, a configuration signal; controlling individual elements of an array of light emitters to emit light into the environment based at least in part on the configuration signal; receiving, based at least in part on light emitted into the environment, second sensor data from a second sensor associated with the vehicle; and controlling the vehicle based at least in part on the second sensor data.

G. The method of paragraph F, further comprising: determining that a number of pixels in the region of interest are associated with a brightness below a threshold; determining that the number of pixels meets or exceeds a threshold number of unreliable pixels; and wherein the configuration signal causes a portion of elements corresponding to the region of interest to emit light at an increased illumination intensity for a predetermined period of time.

H. The method of paragraph F or G, further comprising: determining, based at least in part on the first sensor data, an object in the environment; and inputting into a machine learned model one or more of a classification of the object or a distance of the object to the vehicle, wherein the configuration signal is based on the one or more of the classification or the distance.

I. The method of paragraph H, wherein the region of interest is associated with a headlight of an oncoming vehicle, the method further comprising: determining a trajectory of the oncoming vehicle; and wherein the configuration signal causes a portion of elements corresponding to the region of interest to emit light at a decreased illumination intensity based at least in part on the trajectory of the oncoming vehicle.

J. The method of any of paragraphs F-I, wherein: the region of interest is associated with a reflective surface, and the configuration signal causes a portion of elements corresponding to the region of interest to emit light at a decreased illumination intensity.

K. The method of paragraph J, wherein the reflective surface comprises at least one of: a retroreflector; a traffic sign; a vehicle mirror; a high reflective decorative trim; or a wet surface.

L. The method of any of paragraphs F-K, wherein the first sensor data comprises lidar sensor data and the second sensor data comprises image data.

M. The method of any of paragraphs F-L, wherein the first sensor data comprises first image data and the second sensor data comprises second image data.

N. The method of any of paragraphs F-M, wherein the machine learned model is trained based at least in part on: inputting image data into an object detector configured to detect objects, the image data associated with a training configuration signal; detecting an object in the image data, the object associated with a confidence score; determining at least one of a cost or a loss based on the confidence score; and training the machine learned model based on at least one of the cost or the loss.

O. The method of any of paragraphs F-N, wherein the array of light emitters is configured to output a first color when the vehicle is traveling a first direction and to output a second color when the vehicle is travelling a second direction that is opposite the first direction.

P. One or more non-transitory computer-readable media storing instructions that, when executed, configure one or more processors to perform operations comprising: receive first sensor data from a first sensor associated with a vehicle traversing an environment; determine, based at least in part on the first sensor data, a region of interest in the environment; based at least in part on the region of interest, input the first sensor data into a machine learned model; receive, as output from the machine learned model, a configuration signal; control individual elements of an array of light emitters to emit light into the environment based at least in part on the configuration signal; receive, based at least in part on light emitted into the environment, second sensor data from a second sensor associated with the vehicle; and cause the vehicle to be controlled based at least in part on the second sensor data.

Q. The one or more non-transitory computer-readable media of paragraph P, wherein: the one or more sensors comprise a lidar sensor and an image sensor, the first sensor data comprises lidar data received from the lidar sensor at a first time, and the second sensor data comprises image data received from the image sensor at a second time after the first time.

R. The one or more non-transitory computer-readable media of paragraphs P or Q, wherein the machine learned model is trained based at least in part on: inputting image data into an object detector configured to detect objects, the image data associated with a training configuration signal; detecting an object in the image data, the object associated with a confidence score; determining a loss based on the confidence score; and training the machine learned model based on at the loss.

S. The one or more non-transitory computer-readable media of any of paragraphs P-R, the operations further comprise: inputting one or more of environmental data, map data, or time data into the machine learned model, wherein the configuration signal is based at least in part on the one or more of the environmental data, the map data, or the time data.

T. The one or more non-transitory computer-readable media of any of paragraphs P-S, the operations further comprise: determining, based at least in part on the first sensor data, an object in the environment; and inputting into a machine learned model one or more of a classification of the object or a distance of the object to the vehicle, wherein the configuration signal is based on the one or more of the classification or the distance.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   a light source comprising an array of light emitters configured to controllably emit light into an environment;
   one or more sensors;
   one or more processors; and
   one or more non-transitory computer-readable media storing computer-executable instructions that, when executed by the one or more processors, configure the system to perform operations comprising:
      receiving first sensor data from the one or more sensors;
      determining, based at least in part on the first sensor data, a region of interest in the environment;

based at least in part on the region of interest, inputting the first sensor data into a machine learned model;
receiving, as output from the machine learned model, a configuration signal configured to alter a configuration of the array of light emitters;
controlling individual elements of the array of light emitters of the light source to emit light into the environment based at least in part on the configuration signal;
capturing second sensor data based at least in part on the light emitted into the environment; and
controlling a vehicle based at least in part on the second sensor data.

2. The system of claim 1, wherein the configuration signal causes a first portion of elements to emit light at a first illumination intensity and causes a second portion of elements different than the first portion to emit light at a second illumination intensity, wherein the first illumination intensity is higher than the second illumination intensity.

3. The system of claim 1, wherein:
the one or more sensors comprise a lidar sensor and an image sensor,
the first sensor data comprises lidar data received from the lidar sensor at a first time, and
the second sensor data comprises image data received from the image sensor at a second time after the first time.

4. The system of claim 1, wherein the machine learned model is trained based at least in part on:
inputting image data into an object detector configured to detect objects, the image data associated with a training configuration signal;
detecting an object in the image data, the object associated with a confidence score;
determining a loss based on the confidence score; and
training the machine learned model based on the loss.

5. The system of claim 1, the operations further comprising:
inputting one or more of environmental data, map data, or time data into the machine learned model, wherein the configuration signal is based at least in part on the one or more of the environmental data, the map data, or the time data.

6. A method comprising:
receiving first sensor data from a first sensor associated with a vehicle traversing an environment;
determining, based at least in part on the first sensor data, a region of interest in the environment;
based at least in part on the region of interest, inputting the first sensor data into a machine learned model;
receiving, as output from the machine learned model, a configuration signal configured to alter a configuration of an array of light emitters;
controlling individual elements of the array of light emitters to emit light into the environment based at least in part on the configuration signal;
receiving, based at least in part on light emitted into the environment, second sensor data from a second sensor associated with the vehicle; and
controlling the vehicle based at least in part on the second sensor data.

7. The method of claim 6, further comprising:
determining that a number of pixels in the region of interest are associated with a brightness below a threshold; and
determining that the number of pixels meets or exceeds a threshold number of unreliable pixels,
wherein the configuration signal causes a portion of elements corresponding to the region of interest to emit light at an increased illumination intensity.

8. The method of claim 6, further comprising:
determining, based at least in part on the first sensor data, an object in the environment; and
inputting into a machine learned model one or more of a classification of the object or a distance of the object to the vehicle,
wherein the configuration signal is based on the one or more of the classification or the distance.

9. The method of claim 8, wherein the region of interest is associated with a headlight of an oncoming vehicle, the method further comprising:
determining a trajectory of the oncoming vehicle,
wherein the configuration signal causes a portion of elements corresponding to the region of interest to emit light at a decreased illumination intensity based at least in part on the trajectory of the oncoming vehicle.

10. The method of claim 6, wherein:
the region of interest is associated with a reflective surface, and
the configuration signal causes a portion of elements corresponding to the region of interest to emit light at a decreased illumination intensity.

11. The method of claim 10, wherein the reflective surface comprises at least one of:
a retroreflector;
a traffic sign;
a vehicle mirror;
a high reflective decorative trim; or
a wet surface.

12. The method of claim 6, wherein the first sensor data comprises lidar sensor data and the second sensor data comprises image data.

13. The method of claim 6, wherein the first sensor data comprises first image data and the second sensor data comprises second image data.

14. The method of claim 6, wherein the machine learned model is trained based at least in part on:
inputting image data into an object detector configured to detect objects, the image data associated with a training configuration signal;
detecting an object in the image data, the object associated with a confidence score;
determining at least one of a cost or a loss based on the confidence score; and
training the machine learned model based on at least one of the cost or the loss.

15. The method of claim 6, wherein the array of light emitters is configured to output a first color when the vehicle is traveling a first direction and to output a second color when the vehicle is travelling a second direction that is opposite the first direction.

16. One or more non-transitory computer-readable media storing instructions that, when executed, configure one or more processors to perform operations comprising:
receive first sensor data from a first sensor associated with a vehicle traversing an environment;
determine, based at least in part on the first sensor data, a region of interest in the environment;
based at least in part on the region of interest, input the first sensor data into a machine learned model;
receive, as output from the machine learned model, a configuration signal configured to alter a configuration of an array of light emitters;

control individual elements of the array of light emitters to emit light into the environment based at least in part on the configuration signal;

receive, based at least in part on light emitted into the environment, second sensor data from a second sensor associated with the vehicle; and cause the vehicle to be controlled based at least in part on the second sensor data.

17. The one or more non-transitory computer-readable media of claim 16, wherein:

the first sensor comprises a lidar sensor and the second sensor comprises an image sensor, the first sensor data comprises lidar data received from the lidar sensor at a first time, and the second sensor data comprises image data received from the image sensor at a second time after the first time.

18. The one or more non-transitory computer-readable media of claim 16, wherein the machine learned model is trained based at least in part on:

inputting image data into an object detector configured to detect objects, the image data associated with a training configuration signal;

detecting an object in the image data, the object associated with a confidence score;

determining a loss based on the confidence score; and training the machine learned model based on the loss.

19. The one or more non-transitory computer-readable media of claim 16, the operations further comprise:

inputting one or more of environmental data, map data, or time data into the machine learned model, wherein the configuration signal is based at least in part on the one or more of the environmental data, the map data, or the time data.

20. The one or more non-transitory computer-readable media of claim 16, the operations further comprise:

determining that a number of pixels in the region of interest are associated with a brightness below a threshold; and determining that the number of pixels meets or exceeds a threshold number of unreliable pixels, wherein the configuration signal causes a portion of elements corresponding to the region of interest to emit light at an increased illumination intensity for a predetermined period of time.

\* \* \* \* \*